(12) United States Patent
Arai et al.

(10) Patent No.: US 9,505,250 B2
(45) Date of Patent: Nov. 29, 2016

(54) IMAGE FORMING SYSTEM AND NETWORK MANAGEMENT DEVICE INCLUDING AN IMAGE FORMING APPARATUS AND AN ACCESSORY DEVICE

(71) Applicant: CANON KABUSHIKI KAISHA, Tokyo (JP)

(72) Inventors: Akihiro Arai, Toride (JP); Mitsuhiko Sato, Kashiwa (JP); Toshiyuki Miyake, Abiko (JP); Takashi Yokoya, Kashiwa (JP); Hiromasa Maenishi, Matsudo (JP); Yutaka Ando, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/709,934

(22) Filed: May 12, 2015

(65) Prior Publication Data
US 2015/0332134 A1    Nov. 19, 2015

(30) Foreign Application Priority Data

May 13, 2014    (JP) .................................. 2014-099602

(51) Int. Cl.
| | |
|---|---|
| *G06K 15/00* | (2006.01) |
| *G06F 3/12* | (2006.01) |
| *B41J 29/38* | (2006.01) |
| *G03G 21/00* | (2006.01) |
| *G06F 13/00* | (2006.01) |
| *H04N 1/00* | (2006.01) |

(52) U.S. Cl.
CPC ............... *B41J 29/38* (2013.01); *G03G 21/00* (2013.01); *G06F 3/121* (2013.01); *G06F 3/1203* (2013.01); *G06F 3/1236* (2013.01); *G06F 3/1294* (2013.01); *G06F 13/00* (2013.01); *G06K 15/4025* (2013.01); *H04N 1/00* (2013.01)

(58) Field of Classification Search
None
See application file for complete search history.

(56) References Cited

U.S. PATENT DOCUMENTS

| | | | |
|---|---|---|---|
| 7,830,540 B2* | 11/2010 | Matsuda ............ | H04N 1/32619 358/1.15 |
| 2007/0086045 A1 | 4/2007 | Nishikata et al. | |
| 2007/0291306 A1* | 12/2007 | Fujino ..................... | G06F 3/121 358/1.15 |
| 2012/0050808 A1* | 3/2012 | Kamomae ............... | G06F 3/121 358/1.15 |
| 2014/0176984 A1* | 6/2014 | Nakayama ......... | H04N 1/00891 358/1.14 |

OTHER PUBLICATIONS

U.S. Appl. No. 14/707,512, filed May 8, 2015.

* cited by examiner

*Primary Examiner* — Thomas D Lee
(74) *Attorney, Agent, or Firm* — Fitzpatrick, Cella, Harper & Scinto

(57) ABSTRACT

An image forming system which can recognize the network configuration in real time is provided. The image forming system comprises an image forming apparatus for performing image formation and one or more accessory devices capable of establishing communication with the image forming apparatus via network bus. The image forming apparatus stores identification information which identifies each of the one or more accessory devices. The accessory device detects a communication state of the network bus to notify the image forming apparatus or accessory device which is adjacent of occurrence of communication error not via the network bus. When the occurrence of the communication error of the network bus is notified from the accessory device which is adjacent, the image forming apparatus realizes the network configuration in real time and erases the identification information stored.

11 Claims, 17 Drawing Sheets

| DEVICE NAME | NODE ID |
|---|---|
| IMAGE FORMING APPARATUS | 1 |
| SHEET FEEDING DEVICE | 2 |
| STACKER | 5 |
| CASE WORK DEVICE | 7 |
| FINISHER | 8 |

| CONFIRMATION OF DEVISE |
|---|
| THE MARKED DEVICE IS NOT RECOGNIZABLE. PLEASE CONFIRM CONNECTION OF POWER CABLE AND COMMUNICATION CABLE AND PRESS [RE-RECOGNITION] KEY.<br>(IF STARTING IN THIS STATE, PRESS [FORCIBLY-STARTING] KEY.) |

| | |
|---|---|
| | SHEET FEEDING DEVICE 1 |
|  | SHEET FEEDING DEVICE 2 |
| | STACKER 1 |
|  | STACKER 2 |
| | CASE WORK DEVICE |
| | FINISHER |

| FORCIBLY STARTING | RE-RECOGNITION |
|---|---|

| UPSTREAM SIDE DEVICE LIST ||| 
|---|---|---|
| ARRANGEMENT ORDER | ARRANGEMENT ORDER | NODE ID |
| 1 | SHEET FEEDING DEVICE | 2 |

| DOWNSTREAM SIDE DEVICE LIST ||| 
|---|---|---|
| ARRANGEMENT ORDER | ARRANGEMENT ORDER | NODE ID |
| 1 | STACKER | 5 |
| 3 | CASE WORK DEVICE | 7 |
| 4 | FINISHER | 8 |

| UPSTREAM SIDE DEVICE LIST |||
|---|---|---|
| ARRANGEMENT ORDER | ARRANGEMENT ORDER | NODE ID |
| 1 | SHEET FEEDING DEVICE | 2 |

| DOWNSTREAM SIDE DEVICE LIST |||
|---|---|---|
| ARRANGEMENT ORDER | ARRANGEMENT ORDER | NODE ID |
| 1 | STACKER | 5 |

IMAGE FORMING SYSTEM AND NETWORK MANAGEMENT DEVICE INCLUDING AN IMAGE FORMING APPARATUS AND AN ACCESSORY DEVICE

BACKGROUND OF THE INVENTION

Field of the Invention

The present disclosure relates to an image forming system which comprises an image forming apparatus such as an electrophotographic printer and various accessory devices connected to the image forming apparatus.

Description of the Related Art

An image forming system is configured by an image forming apparatus and an accessory device. In the system, the accessory device, such as a sheet feeding device, a stacker, a book binding device, a finisher and the like, are connected to the image forming apparatus. The image forming apparatus and the accessory device of the image forming system are connected through a bus topology network to establish data communication therebetween. By freely constituting each device, high-speed communication can be established through the bus topology network.

In the image forming system, the image forming apparatus and the accessory device are connected in series. Sheet delivery is performed between the devices. Thus, each device is required to at least identify adjacent device and transmit/receive information required for sheet delivery to/from the device. To identify each device in the image forming system, identification information, which is unique to a device and is called node ID, is assigned to each device. It is generally known that, in bus topology, device is identified by the node ID to establish communication between devices. Each device connected to the bus topology network is capable of recognizing the type of device connected by the node ID. However, it is difficult to physically recognize an order in which each device is connected unless performing some methods for identifying the connected device each time the device is connected, etc.

In case of the image forming system, it is general that the node ID is managed by the image forming apparatus. The image forming apparatus holds a connection order of the accessory devices in the built-in memory. Then, the image forming apparatus compares the detection result obtained by the detection of the connection state by performing the method for identifying etc., with the connection order held in the memory. Through this, the image forming apparatus confirms the connection state. If the connection order held in the memory does not match the detection result, the image forming apparatus notifies a user that an abnormality has occurred in the connection of the accessory devices and prompts the user to take some appropriate actions to solve the situation.

For example, in US2007/0086045(A1), when the connection order held does not match the detection result, the image forming apparatus displays a message. In the message, the user is prompted to input an instruction to disconnect the accessory device to make the apparatus available.

As a communication system, the US2007/0086045(A1) adapts ARCNET (Attached Resource Computer NETwork) to detect disconnection of the device from the network. However, in the US2007/0086045(A1), unless network reconfiguration processing is performed, it is not possible to determine the device which is disconnected from the network. Thus, it is difficult for the image forming apparatus to recognize the network configuration in real time.

SUMMARY OF THE INVENTION

According to an aspect of the present disclosure, an image forming system includes an image forming apparatus configured to perform image formation and one or more accessory devices configured to be capable of establishing communication with the image forming apparatus via a network bus, wherein the accessory device comprises: a first detection unit configured to detect a communication state of the network bus; a first notification unit configured to notify the adjacent image forming apparatus or other adjacent accessory device of communication state of the network bus not via the network bus; and a first control unit configured to cause the first notification unit to notify the adjacent image forming apparatus or other adjacent accessory device of an occurrence of the communication error of the network bus when the first detection unit detects communication error of the network bus. Further, the image forming apparatus comprises: a storing unit configured to store identification information which identifies the accessory device; and a second control unit configured to erase the identification information stored in the storing unit when the occurrence of the communication error of the network bus is notified from the first communication unit of an adjacent accessory device.

Further features of the present invention will become apparent from the following description of exemplary embodiments (with reference to the attached drawings).

DESCRIPTION OF THE EMBODIMENTS

In the following, embodiments are described in detail with reference to the accompanying drawings.

(Configuration of Image Forming System)

Figure 1:
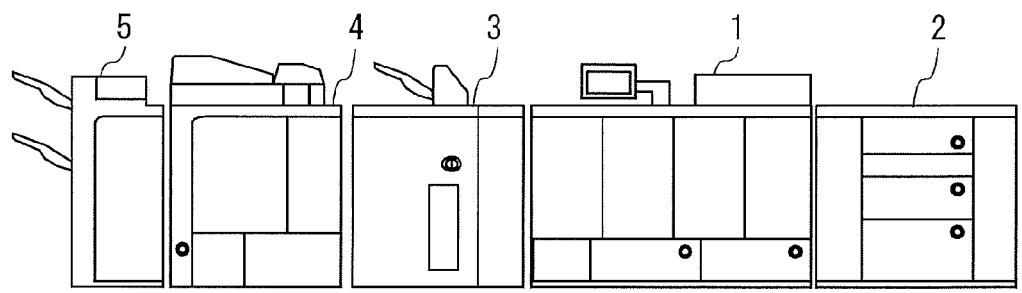
FIG. 1 is a diagram illustrating a front external view of an image forming system.

FIG. 1 is a diagram illustrating a front external view of an image forming system of the present embodiment. The image forming system comprises an image forming apparatus 1, a sheet feeding device 2, a stacker 3, a case work device 4, and a finisher 5. The sheet feeding device 2, the stacker 3, the case work device 4, and the finisher 5 are examples of accessory device so that the image forming system may comprise other accessory devices. According to the user's purpose of use, one or more accessory devices are freely configured in the image forming system. The image forming apparatus 1 performs entire control of the image forming system.

A sheet is conveyed from the sheet feeding device 2 to the image forming apparatus 1, the stacker 3, the case work device 4, and the finisher 5 in order. In the following, based on the sheet conveyance order, a conveyance source side is defined as upstream side, and a conveyance destination side is defined as downstream side.

The image forming apparatus 1 which performs the image forming processing is provided between one or more accessory devices. The sheet feeding device 2 is connected to the upstream side of the image forming apparatus 1. The image forming apparatus 1 also works as a network management device which manages the accessory devices which form the image forming system. The sheet feeding device 2 supplies sheets used for image formation to the image forming apparatus 1. Further, the stacker 3, the case work device 4, and the finisher 5 are connected to the downstream side of the image forming apparatus 1 in series. The stacker 3 stacks sheets having images formed thereon by the image forming apparatus 1. The case work device 4 performs gluing bookbinding of the sheets having images formed thereon. The finisher 5 performs post-processing of the sheets having images formed thereon such as staple processing, sort processing, and the like.

Figure 2:
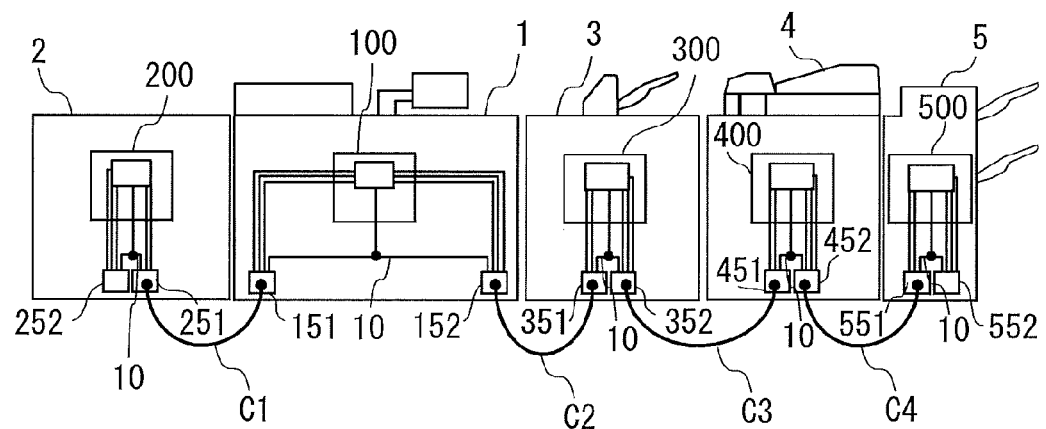
FIG. 2 is a diagram illustrating a back external view of an image forming system.

FIG. 2 is a diagram illustrating a back external view of the image forming system in FIG. 1. Each device is connected to the adjacent devices by cable so that each device is capable of establishing communication with each other. Therefore, the image forming apparatus 1 has connectors 151 and 152. The sheet feeding device 2 has connectors 251 and 252. The second stacker 3 has connectors 351 and 352. The case work device 4 has connectors 451 and 452. The finisher 5 has connectors 551 and 552.

The connector 151 of the image forming apparatus 1 is connected to the connector 251 of the sheet feeding device 2 by a cable C1. The connector 152 of the image forming apparatus 1 is connected to the connector 351 of the stacker 3 by a cable C2. The connector 352 of the stacker 3 is connected to the connector 451 of the case work device 4 by a cable C3. The connector 452 of the case work device 4 is connected to the connector 551 of the finisher 5 by a cable C4. The connector 252 of the sheet feeding device 2 and the connector 552 of the finisher 5, to which no cable is connected, are respectively connected to terminal resistor, which is provided in the apparatus, through network bus 10. Note that the terminal resistor is included in all devices. The connector, to which no cable is connected, is connected to the terminal resistor.

The image forming apparatus 1 includes a control unit 100. The control unit 100 is connected to the connectors 151 and 152. The sheet feeding device 2 includes a control unit 200. The control unit 200 is connected to the connectors 251 and 252. The stacker 3 includes a control unit 300. The control unit 300 is connected to the connectors 351 and 352. The case work device 4 includes a control unit 400. The control unit 400 is connected to the connectors 451 and 452. The finisher 5 includes a control unit 500. The control unit 500 is connected to the connectors 551 and 552.

(Control System)

Figure 3:
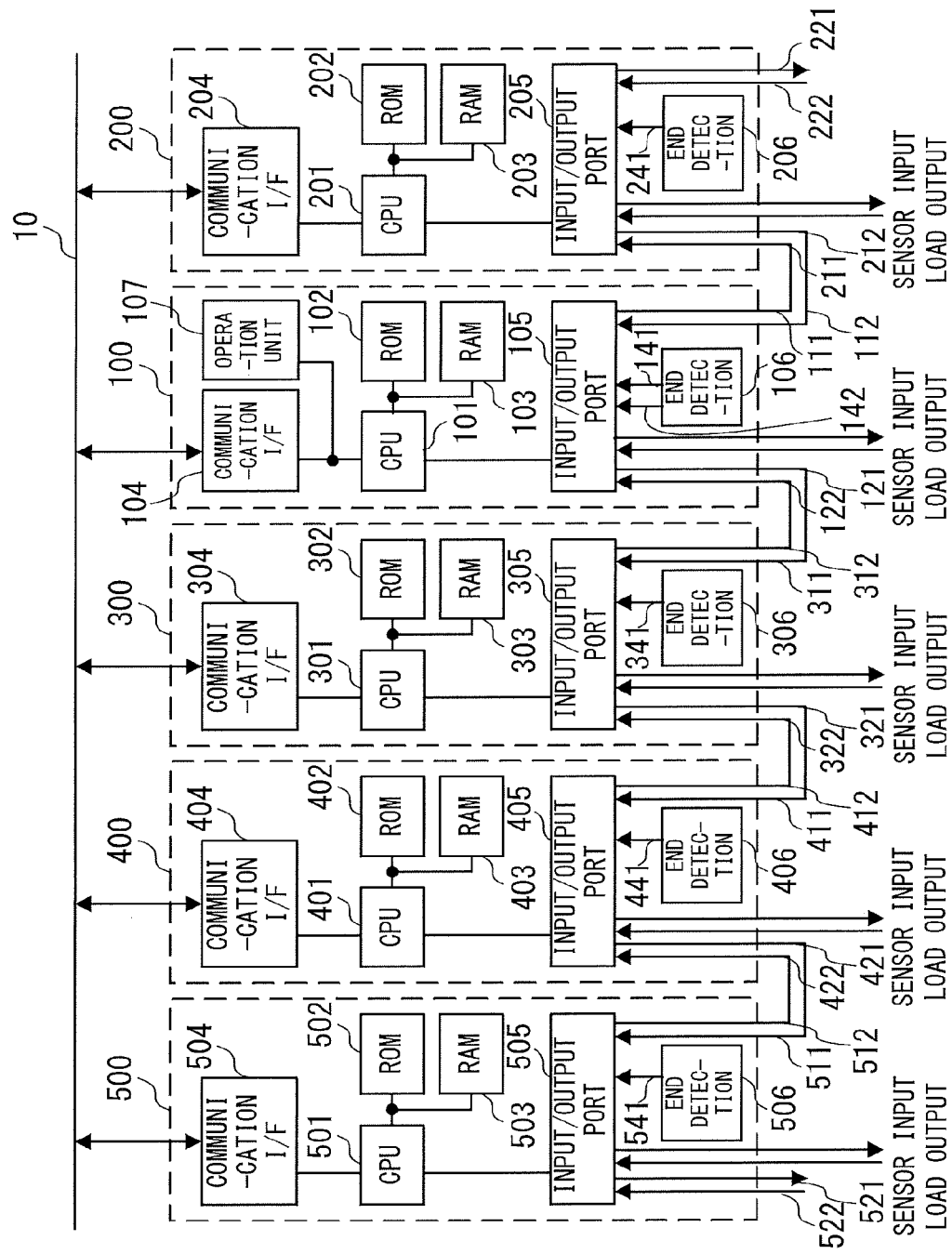
FIG. 3 is a configuration diagram a control system.

FIG. 3 is a configuration diagram of a control system formed by control units 100 to 500. As shown in FIG. 2, each control unit 100 to 500 is connected to the control units of other adjacent devices by the cables C1 to C4. Each cable C1 to C4 includes a bus line of the network bus 10. Thus, each of the control unit 100 to 500 is connected to the network bus 10. Each of the control unit 100 to 500 is capable of performing broadcast transmission of data to the rest of the control units connected to the network bus 10. Further, each of the control unit 100 to 500 is a multi-master which is capable of starting data transmission by themselves. As a communication system through the network bus 10, Ethernet™, Controller Area Network (CAN), ARCNET and the like, which are multi-master and capable of broadcast transmission, can be used.

The control unit 100 of the image forming apparatus 1 comprises a central processing unit (CPU) 101, a read only memory (ROM) 102, and a random access memory (RAM) 103. The control unit 100 further comprises a communication interface (I/F) 104, an input/output port 105, and an operation unit 107.

The CPU 101 controls an operation of the image forming apparatus 1 by reading computer program stored in the ROM 102 and executing the computer program using the RAM 103 as a work area. Further, the CPU 101 is connected to the network bus 10 via the communication I/F 104. By transmitting and receiving control data to/from the rest of the control units 200 to 500, the CPU 101 can control the operation of the accessory device faster than daisy chain connection and the like.

In addition to performing communication control with other devices, the communication I/F 104 has a function to detect communication error, such as failure of establishing communication, by monitoring communication state of the network bus 10. The communication error includes, for example, parity error, checksum error, overrun error and the like. Such communication error occurs by a noise such as thunder, failure of the communication I/F 104, deterioration of the network bus 10 and the like. When the communication I/F 104 detects the communication error, the CPU 101 cannot perform communication via the network bus 10.

The input/output port 105 is connected to the CPU 101 by address bus and data bus. The input/output port 105 includes input ports 112 and 122, output ports 111 and 121, and end detection ports 141 and 142. The input port 112 and the output port 111 are connected to the control unit 200 of the sheet feeding device 2 connected to the upstream side. The input port 122 and the output port 121 are connected to the control unit 300 of the stacker 3 connected to the downstream side. The end detection ports 141 and 142 are the input ports connected to an end detection unit 106. Further, signals from sensors (not shown) are input to the input/output port 105. Control signals to loads (not shown) of motor, clutch and the like are output from the input/output port 105. By obtaining signals from the sensors and outputting the control signals to the loads via the input/output port 105, the CPU 101 controls sheet conveyance processing and image forming processing by the image forming apparatus 1.

Figures 4, 5:
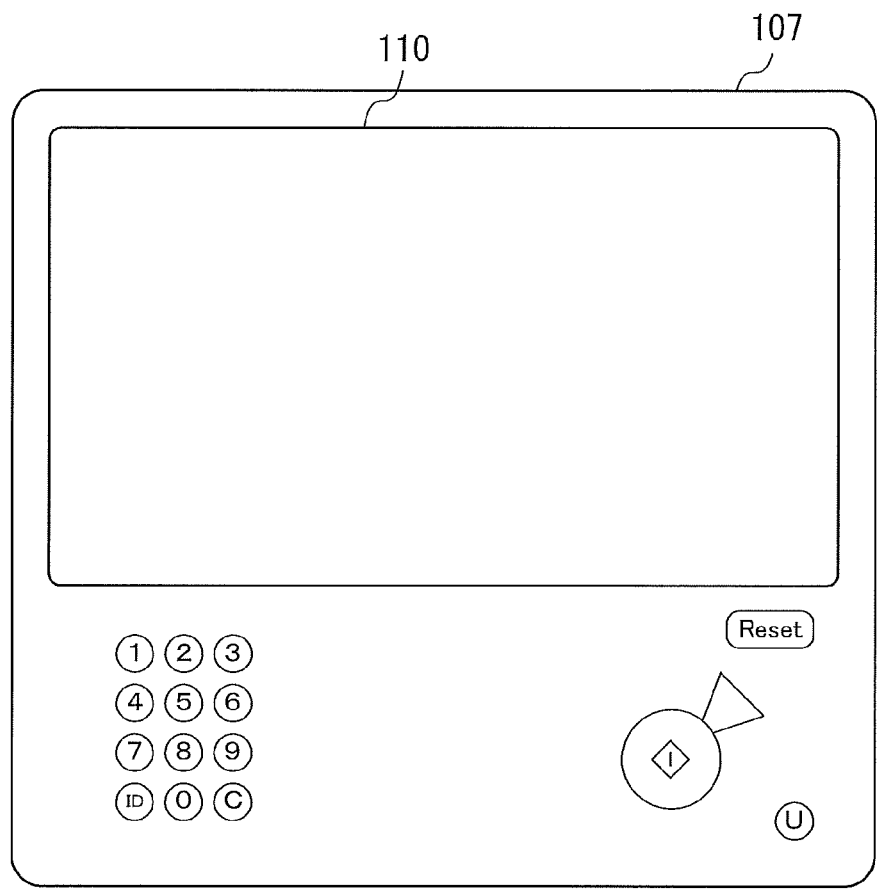
FIG. 4 is a diagram illustrating an external view of a control unit.
FIG. 5 is a diagram explaining the type of device and node ID.

The operation unit 107 is an input device operated by a user. Through the operation unit 107, various settings and instructions are input to the CPU 101. Further, the operation unit 107 comprises a display device, where visually provides information to the user by the control of the CPU 101. FIG. 4 is a diagram illustrating the appearance of the control unit 107. The operation unit 107 comprises a liquid crystal display section 110 which comprises a touch panel. By touching a display screen of the liquid crystal display section 110, the user can perform setting operation relating to the image formation. Further, the user can confirm the state of the image forming system by the contents displayed on the liquid crystal display section 110. In addition, the operation unit 107 comprises physical key buttons. By the user's key operation, instruction according to the key button is input to the CPU 101.

The control unit 200 of the sheet feeding device 2 comprises a CPU 201, a ROM 202, a RAM 203, a communication I/F 204, and an input/output port 205.

The CPU 201 controls an operation of the sheet feeding device 2 by reading computer program stored in the ROM 202 and executing the computer program using the RAM 203 as a work area. Further, the CPU 201 is connected to the network bus 10 via the communication I/F 204. By transmitting and receiving control data to/from the control units 100, which is adjacent to the control unit 200, via the network bus 10, the CPU 201 controls sheet delivery operation and the like. The CPU 201 is capable of performing broadcast transmission of data through the network bus 10 via the communication I/F 204 and receiving data which is broadcast transmitted from the rest of the control units 100 and 300 to 500.

In addition to performing communication control with other devices, the communication I/F 204 has function to detect communication error. The communication error includes, for example, parity error, checksum error, overrun error and the like. Such communication error occurs by a noise such as thunder, failure of the communication I/F 204, deterioration of the network bus 10 and the like. When the communication I/F 204 detects the communication error, the CPU 201 cannot perform communication via the network bus 10.

The input/output port 205 is connected to the CPU 201 by address bus and data bus. The input/output port 205 includes input ports 211 and 222, output ports 212 and 221, and end detection port 241. The input port 211 and the output port 212 are connected to the control unit 100 of the image forming apparatus 1. The input port 222 and the output port 221 are terminated by terminal resistor. Further, signals from sensors (not shown) are input to the input/output port 205. Control signals to loads (not shown) of motor, clutch and the like are output from the input/output port 205. By obtaining signals from the sensors and outputting the control signals to the loads via the input/output port 205, the CPU 201 controls sheet conveyance and sheet feeding by the first sheet feeding device 2.

The configuration of the control units 300, 400, and 500 of the stacker 3, the case work device 4, and the finisher 5 respectively is similar to that of the control unit 200 of the sheet feeding device 2.

By transmitting and receiving control data to/from the control units 100 and 400, each of which is adjacent to the control unit 300, via the network bus 10, the CPU 301 of the control unit 300 controls the sheet delivery operation and the like. The CPU 301 is capable of performing broadcast transmission of data through the network bus 10 via the communication I/F 304 and receiving data which is broadcast transmitted from the rest of the control units 100, 200, 400 and 500. By obtaining signals from the sensors and outputting the control signals to the loads via the input/output port 305, the CPU 301 controls sheet conveyance and sheet feeding by the stacker 3. The input port 311 and the output port 312 of the control unit 300 are connected to the control unit 100 of the image forming apparatus 1. The input port 322 and the output port 321 are connected to the control unit 400 of the case work device 4.

By transmitting and receiving control data to/from the control units 300 and 500, each of which is adjacent to the control unit 400, via the network bus 10, the CPU 401 of the control unit 400 controls the sheet delivery operation and the like. The CPU 401 is capable of performing broadcast transmission of data via the communication I/F 404 and receiving data which is broadcast transmitted from the rest of the control units 100 to 300 and 500. By obtaining signals from the sensors and outputting the control signals to the loads via the input/output port 405, the CPU 401 controls sheet conveyance and post-processing of the case work device 4. The input port 411 and the output port 412 of the control unit 400 are connected to the control unit 300 of the stacker 3. The input port 422 and the output port 421 are connected to the control unit 500 of the finisher 5.

By transmitting and receiving control data to/from the control unit 400, which is adjacent to the control unit 500, via the network bus 10, the CPU 501 of the control unit 500 controls sheet delivery operation and the like. The CPU 501 is capable of performing broadcast transmission of data through the network bus 10 via the communication I/F 504 and receiving data which is broadcast transmitted from the rest of the control units 100 to 400. By obtaining signals from the sensors and outputting the control signals to the loads via the input/output port 505, the CPU 501 controls sheet conveyance and post-processing by the finisher 5. The input port 511 and the output port 512 of the control unit 500 are connected to the control unit 400 of the case work device 4. The input port 522 and the output port 521 are terminated.

Since the control system is configured as above, in addition to the bus line of the network bus 10, the cables C1 to C4 include wiring to connect each input/output port 105 to 505 of the control units 100 to 500.

The CPU 101 of the control unit 100 and the CPU 201 of the control unit 200 are capable of receiving ON/OFF notification via the input/output ports 105 and 205. The CPU 101 of the control unit 100 and the CPU 301 of the control unit 300 are capable of receiving ON/OFF notification via the input/output ports 105 and 305. The CPU 301 of the control unit 300 and the CPU 401 of the control unit 400 are capable of receiving ON/OFF notification via the input/output ports 305 and 405. The CPU 401 of the control unit 400 and the CPU 501 of the control unit 500 are capable of receiving ON/OFF notification via the input/output ports 405 and 505.

The input port 222 and the output port 221 of the control unit 200 and the input port 522 and the output port 521 of the control unit 500 are terminated. Thus, an end detection port 241, connected to an end detection unit 206 of the input/output port 205 of the control unit 200 is turned ON. And an end detection port 541, connected to an end detection unit 506 of the input/output port 505 of the control unit 500 is turned ON. The end detection ports 141, 142, 341, and 441, connected to end detection units 106, 306, and 406 of the rest of the control units 100, 300 and, 400 are turned off.

(Node ID)

Each of the image forming apparatus 1, the sheet feeding device 2, the stacker 3, the case work device 4, and the finisher 5 has a respective basic node ID, which is the type identification information unique to a type of device. Each device holds the basic node ID in the ROMs 102 to 502 of the control units 100 to 500. A node ID is assigned based on the basic node ID. The node ID is the device identification information for identifying communication counterpart when establishing communication between devices. FIG. 5 is a diagram explaining the type of device and the basic node ID.

According to FIG. 5, the basic node ID of the image forming apparatus is "1". The basic node ID of the sheet feeding device 2 is "2". The basic node ID of the stacker 3 is "5". The basic node ID of the case work device 4 is "7". The basic node ID of the finisher 5 is "8". When the node ID, included in the data as received which indicates destination, matches the node ID of its own device, each device determines that the data as received is transmitted to its own device and performs processing.

(Network Configuration Processing)

Each device forming the image forming system performs the network configuration processing when powered on.

(Processing of the Image Forming Apparatus)

Figure 6:
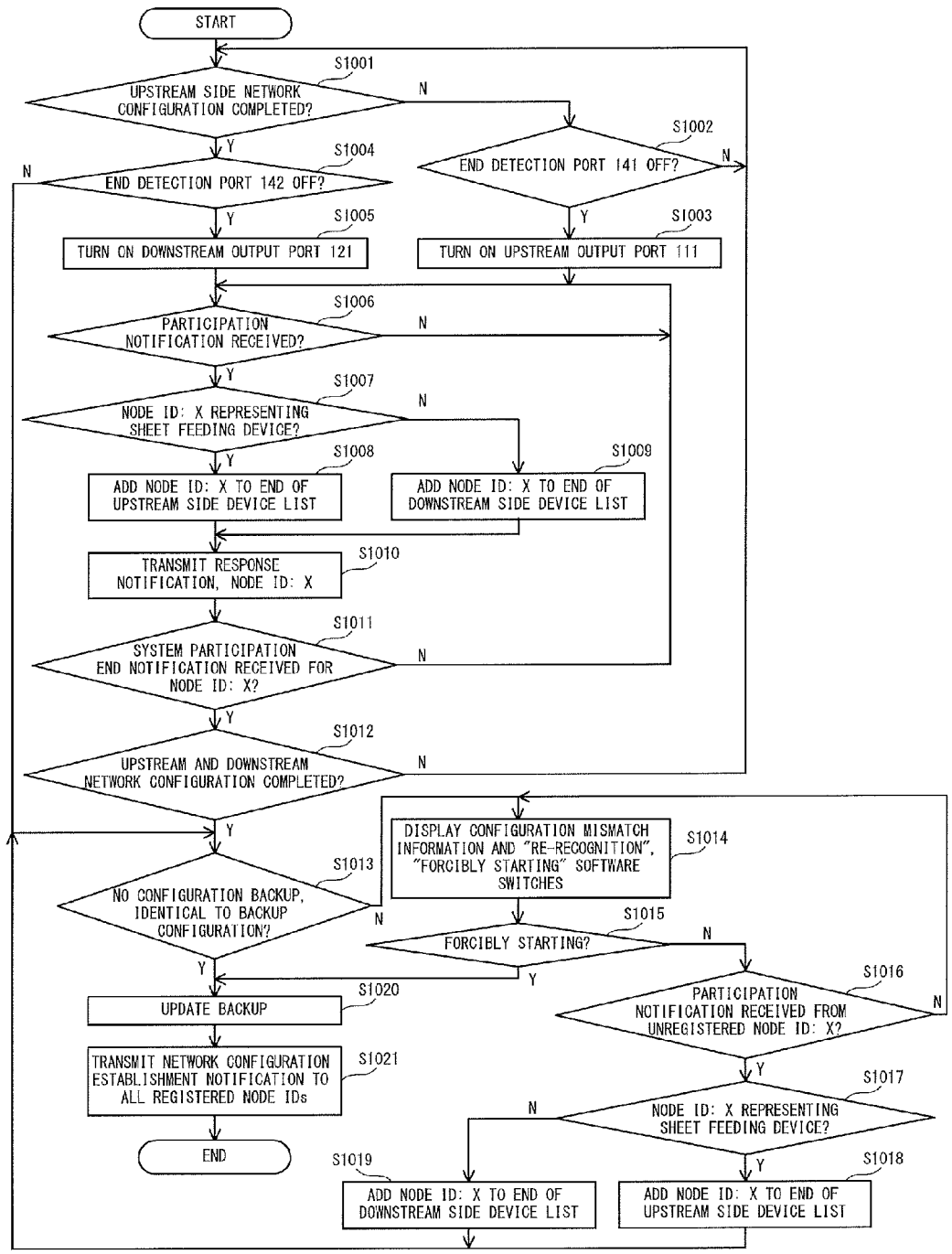
FIG. 6 is a flowchart illustrating network configuration processing by an image forming apparatus.

FIG. 6 is a flowchart illustrating the network configuration processing by the image forming apparatus 1. The image forming apparatus 1 first performs upstream side network configuration processing. Then, the image forming apparatus 1 performs downstream side network configuration processing next.

When the power is turned on, the CPU 101 of the image forming apparatus 1 determines whether the upstream side network configuration is finished or not (S1001). The upstream side network configuration processing is not finished immediately after the power is turned on (S1001: N), so that the CPU 101 determines whether the upstream side end detection port 141 is off or not (S1002). If the upstream side input port 112 and the output port 111 are terminated, the end detection port 141 is turned on (S1002: N). In this case, since no accessory device is connected to the upstream side of the image forming apparatus 1, the upstream side network configuration is finished and the CPU 101 returns to the processing of S1001. If it is determined that the end detection port 141 is off (S1002: Y), the CPU 101 turns on the output port 111 connected to the upstream side accessory device (S1003).

If it is determined that the upstream side network configuration is finished (S1001: Y), the CPU 101 determines whether the downstream side end detection port 142 is off or not (S1004). If the downstream side input port 122 and the output port 121 are terminated, the end detection port 142 is turned on (S1004: N). In this case, since no accessory device is connected to the downstream side of the image forming apparatus 1, the downstream side network configuration is finished and the CPU 101 proceeds to the processing of S1013. If it is determined that the end detection port 142 is off (S1004: Y), the CPU 101 turns on the output port 111 connected to the downstream side accessory device (S1005).

After turning on the output port 111 or the output port 121, the CPU 101 waits for receiving a "participation notification" from the accessory device transmitted via the network bus 10 (S1006). The "participation notification" includes the node ID of the accessory device from which the participation notification is transmitted, i.e., transmission source. The "participation notification" is data transmitted from the accessory device to the image forming apparatus 1 which manages the network. The accessory device transmits the "participation notification" when the accessory device wishes to participate in the image forming system through the network configuration. When receiving the "participation notification" (S1006: Y), the CPU 101 determines whether the node ID(X) of the transmission source included in the "participation notification" is the node ID representing the sheet feeding device (S1007). Here, in addition to the node ID "2" for the sheet feeding device shown in FIG. 5, and "4" are also included as the node ID representing the sheet feeding device. If it is determined that the node ID(X) is the node ID representing the sheet feeding device (S1007: Y), the CPU 101 adds (registers) the node ID(X) to the end of the upstream side device list stored in the RAM 103 (S1008). If it is determined that the node ID(X) is the node ID not representing the sheet feeding device (S1007: N), the CPU 101 adds (registers) the node ID(X) to the end of the downstream side device list stored in the RAM 103 (S1009). The upstream side device list is the list of the node ID of the accessory devices connected to the upstream side of the image forming apparatus 1. The downstream side device list is the list of the node ID of the accessory devices connected to the downstream side of the image forming apparatus 1. Using each list, the image forming apparatus 1 manages the node ID of the accessory devices constituting the image forming system in the arrangement order.

When the node ID(X) is added to the list, the CPU 101 transmits a "response notification" to the accessory device of the transmission source of the node ID (X) via the network bus 10. The "response notification" includes information allowing participation in the system (S1010). After transmitting the "response notification", the CPU 101 determines whether a "system participation end notification" is received via the network bus 10 from the accessory device of the node ID(X) or not (S1011). The "system participation end notification" is the information transmitted from an end accessory device when, among those connected accessory devices, the end accessory device is completed to participate in the system. The end accessory device can determine whether the end accessory device itself is the end accessory device or not by the end detection port. If the "system participation end notification" is not received (S1011: N), it means that the registration of the end accessory device is not yet finished. Thereby, the CPU 101 returns to the processing of S1006 and waits for receiving the "participation notification" from a new accessory device which is unregistered. Repeating the processing of S1006 to S1011, all accessory devices of the upstream side or the downstream side are registered in the RAM 103 of the image forming apparatus 1.

If the "system participation end notification" is received (S1011: Y) the CPU 101 determines whether the upstream side and downstream side network configuration processing is respectively finished or not (S1012). In the present embodiment, the upstream side network configuration processing is first performed. Then, the downstream side network configuration processing is performed next. If the upstream side network configuration processing is only completed (S1012: N), the CPU 101 returns to the processing of S1001 and repeats the processing of S1004 to S1007 and S1009 to S1011.

Figure 7:
FIG. 7 is a diagram illustrating image displayed on a liquid crystal display section.
Figure 7:

When the upstream side and downstream side network configuration processing is completed (S1012: Y), the CPU 101 determines if the upstream side device list and the downstream side device list obtained this time are identical to those having been backed up in the RAM 103 (S1013). The image forming apparatus 1 has backed up the upstream side device list and the downstream side device list of the previous network configuration processing in the RAM 103. The CPU 101 compares the lists in the RAM 103 with the upstream side device list and the downstream side device list obtained this time. If it is determined that the lists in the RAM 103 and the lists obtained this time are not identical (S1013: N), the CPU 101 causes the liquid crystal display section 110 to display an image shown like FIG. 7, including information indicating that the configuration does not match and the software switches of "re-recognition" and "forcibly starting", which are user-selectable (S1014).

The CPU 101 determines whether the user selected the software switch of "forcibly starting" or not (S1015). It means that the CPU 101 determines whether an instruction of "forcibly starting" is input by the operation unit 107 or not. If "re-recognition" is selected (S1015: N), the CPU 101 determines whether or not the "participation notification" including node ID(X) is received again from the accessory device which is unregistered (S1016). If the "participation notification" is not received within a predetermined time (S1016: N), the CPU 101 returns to the processing of S1014 and causes the liquid crystal display section 110 to display the image of FIG. 7 again.

If the "participation notification" is received within a predetermined time (S1016: Y), the CPU 101 determines whether or not the accessory device of the transmission source of the received node ID(X) is the sheet feeding device (S1017). If it is determined that the node ID(X) is the node ID representing the sheet feeding device (S1017: Y), the CPU 101 adds the node ID(X) to the end of the upstream side device list which is stored in the RAM 103 (S1018). If it is determined that the node ID(X) is not the node ID representing the sheet feeding device (S1017: N), the CPU 101 adds the node ID(X) to the end of the downstream side device list which is stored in the RAM 103 (S1019). It means that the CPU 101 generates the upstream side device list and the downstream side device list again through the processing from S1014 to S1019.

If the upstream side device list and the downstream side device list obtained are identical to those having been backed up in the RAM 103, or the backup is not stored (S1013: Y), the CPU 101 updates the backup (S1020). Further, if the user selects the software switch of "forcibly starting" (S1015: Y), the CPU 101 also updates the upstream side device list and the downstream side device list having been backed up (S1020). When updating the backup, the CPU 101 transmits "network configuration completion notification" to the accessory device of all node IDs registered this time via the network bus 10. Then, the CPU 101 finishes the network configuration (S1021).

Through the processing as mentioned, the CPU 101 can configuration network configuration of the accessory device, which is connected to the image forming apparatus 1 and constitutes the image forming system, on the upstream side and the downstream side respectively.

(Processing of Accessory Device)

Figure 8:
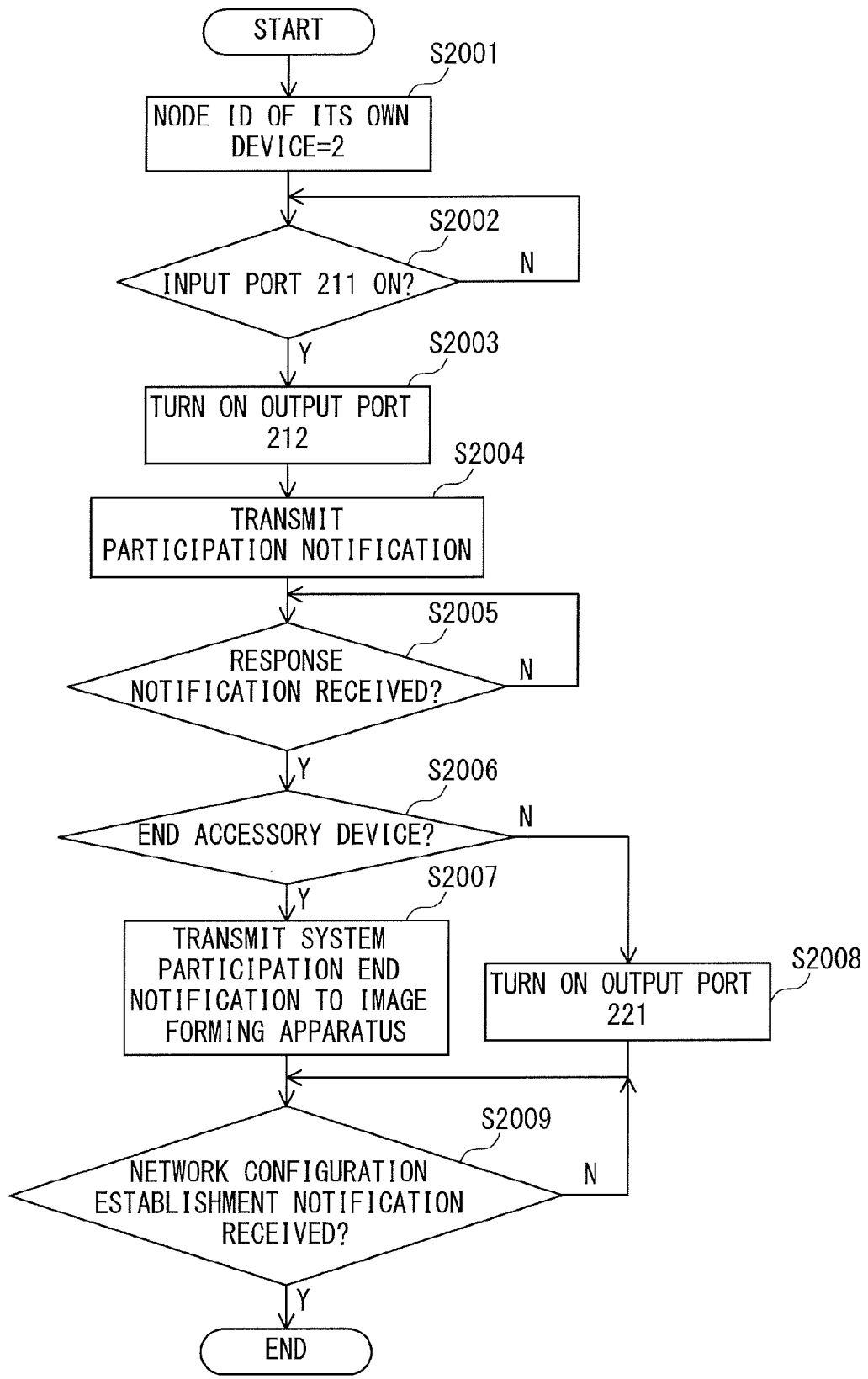
FIG. 8 is a flowchart illustrating network configuration processing by a sheet feeding device.

FIG. 8 is a flowchart representing the network configuration processing by the sheet feeding device 2.

Before participating in the image forming system, the CPU 201 of the sheet feeding device 2 sets the basic node ID stored in the ROM 202 as the node ID of its own device. Then, the CPU 201 stores the set node ID in the RAM 203 (S2001). In particular, the basic node ID of the sheet feeding device is "2" (see FIG. 5), so that the node ID "2" is stored in the RAM 203.

After setting the node ID of its own device, the CPU 201 waits for the input port 211 of the input/output port 205 to be turned on (S2002). When the output port 111 of the image forming apparatus 1 is turned on at S1003 of FIG. 6, the input port 211 is turned on. If the input port 211 is turned on (S2002: Y), the CPU 201 turns on the output port 212 of the image forming apparatus 1 side (S2003).

After turning on the output port 212, the CPU 201 transmits the "participation notification" including the node ID of its own device to the image forming apparatus 1 via the network bus 10 (S2004). After transmitting the "participation notification", the CPU 201 waits for receiving the "response notification" (S2005). When receiving the "participation notification" from the sheet feeding device 2, the image forming apparatus 1 performs the processing from S1006 to S1010 in FIG. 6 as mentioned and transmits the "response notification" to the sheet feeding device 2.

When receiving the "response notification" (S2005: Y), the CPU 201 determines whether the sheet feeding device 2 is the end accessory device of the upstream side connected to the image forming apparatus 1 or not (S2006). By determining whether the end detection port 241 of the input/output port 205 is on or not, the CPU 201 determines whether the sheet feeding device 2 is the end accessory device or not. If it is determined that the CPU 201 is the end accessory device (the end detection port 241 is on) (S2006: Y), the CPU 201 transmits the "system participation end notification" to the image forming apparatus 1 (S2007). If it is determined that the CPU 201 is not the end accessory device (the end detection port 241 is off) (S2006: N), the CPU 201 turns on the output port 221 of the input/output port 205 (S2008) to allow the network configuration processing by the accessory device of the next stage. Thereafter, the CPU 201 waits for receiving a network configuration establishment notification, indicating that the network configuration is finished, from the image forming apparatus 1

(S2009). When receiving the network configuration establishment notification, the CPU 201 ends the processing (S2009: Y).

Through the processing as above, the sheet feeding device 2 participates in the image forming system. The image forming apparatus 1 obtains and manages the node ID "2" of the sheet feeding device 2.

Figure 9:
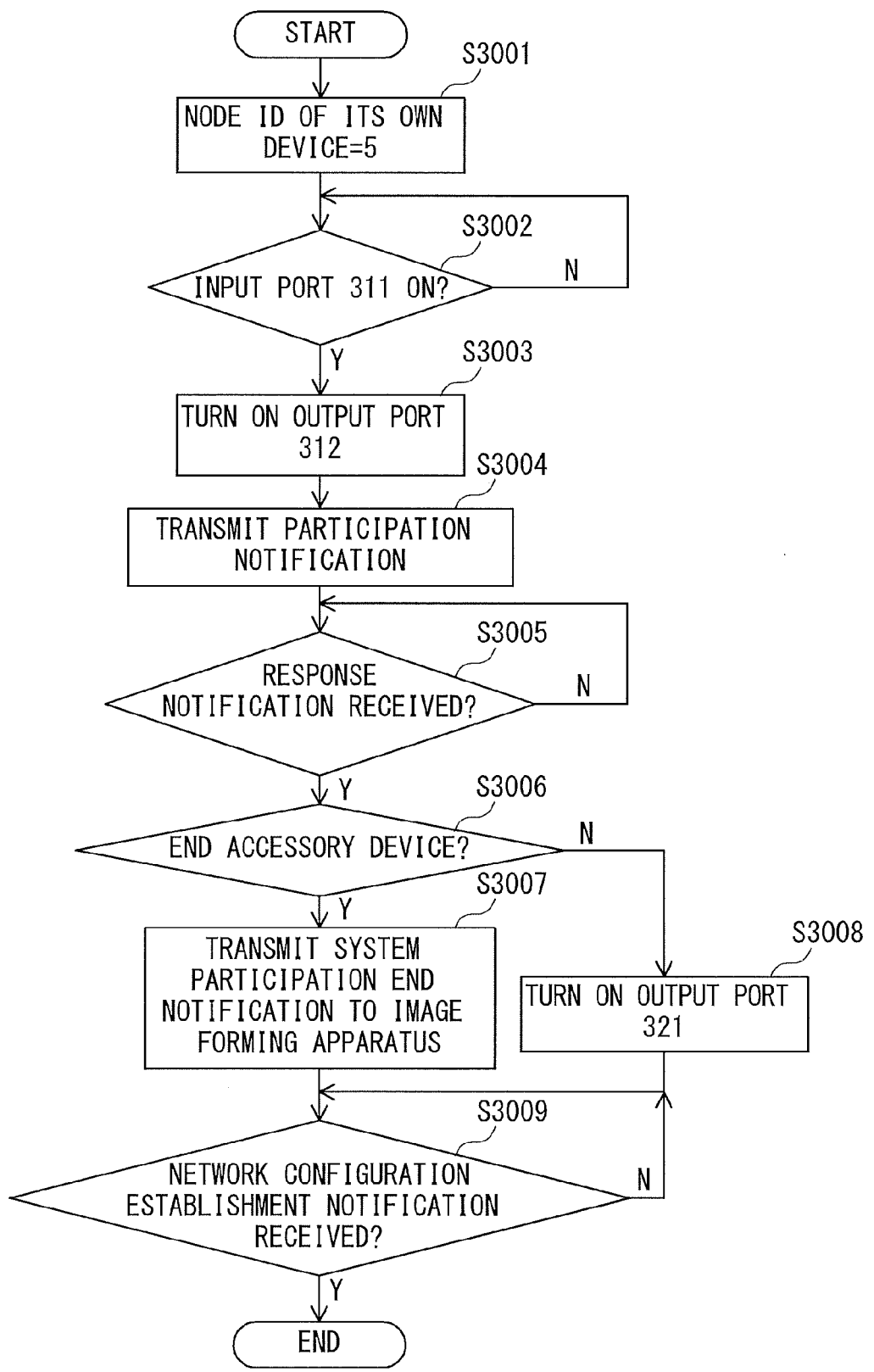
FIG. 9 is a flowchart illustrating network configuration processing by a stacker.
Figure 10:
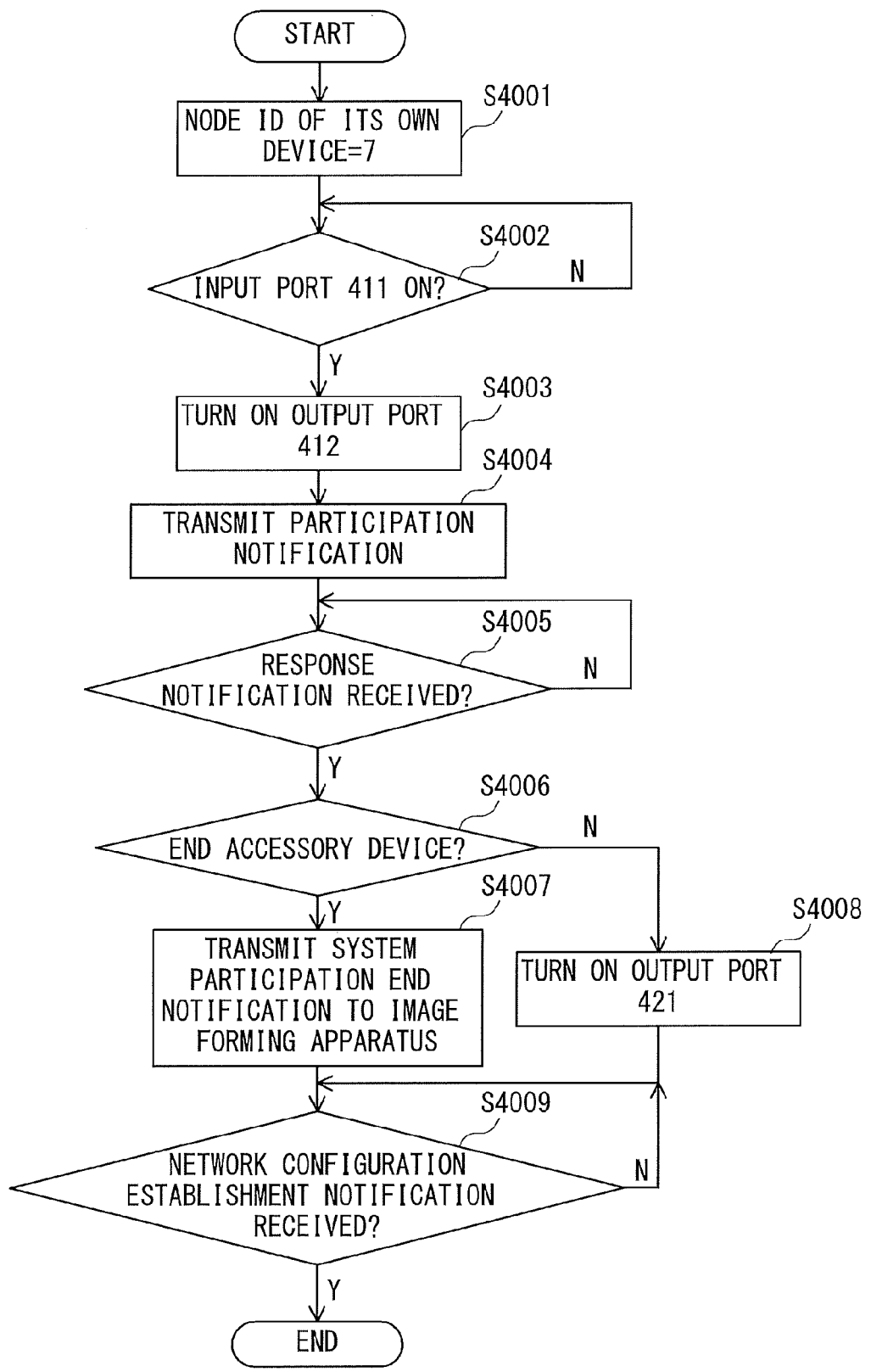
FIG. 10 is a flowchart illustrating network configuration processing by a case work device.

FIG. 9 is a flowchart representing the network configuration processing by the stacker 3. The processing contents are similar to that described with reference to FIG. 8. Thus, the explanation thereof will be omitted. The image forming apparatus 1 manages the stacker 3 by the node ID "5". FIG. 10 is a flowchart representing the network configuration processing by the case work device 4. The processing contents are similar to that described with reference to FIG. 8. Thus, the explanation thereof will be omitted. The image forming apparatus 1 manages the case work device 4 by the node ID "7".

Figure 11:
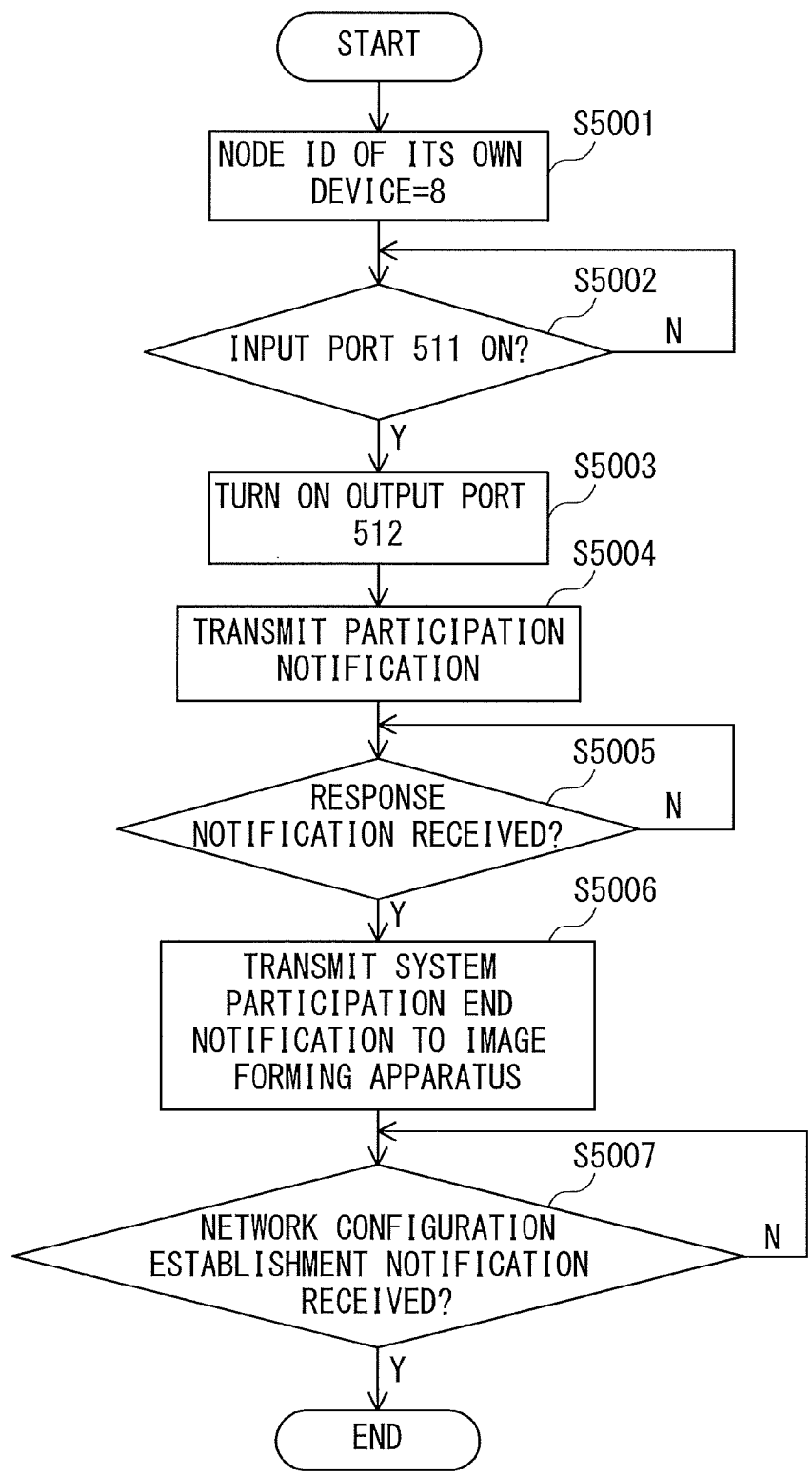
FIG. 11 is a flowchart illustrating a network configuration processing by a finisher.

FIG. 11 is a flowchart representing the network configuration processing by the finisher 5. The CPU 501 of the finisher 5 performs processing similar to the processing from S2001 to S2005 in FIG. 8 (S5001 to S5005). When receiving the "response notification" (S5005: Y), the CPU 501 transmits the "system participation end notification" to the image forming apparatus 1 (S5006). It is determined that, looking from the image forming apparatus 1 in the image forming system, the finisher 5 is provided at the end of the downstream side. Thus, the CPU 501 does not determine whether the finisher 5 is the end accessory device but transmits the "system participation end notification" to the image forming apparatus 1 immediately after receiving the "response notification". Thereafter, the CPU 501 waits for receiving the network configuration establishment notification, indicating that the network configuration is finished, from the image forming apparatus 1 (S5007). When receiving the network configuration establishment notification, the CPU 501 ends the processing (S5007: Y).

Through the processing as above, the finisher 5 participates in the image forming system. The image forming apparatus 1 obtains and manages the node ID "8" of the finisher 5.

Figures 12, 13:
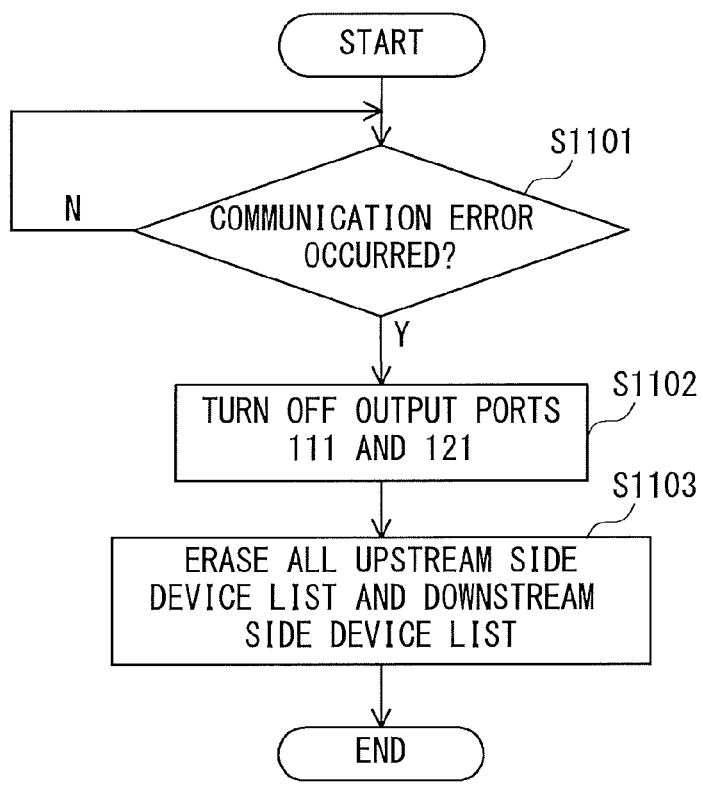
FIG. 12 is a diagram illustrating upstream side device list and downstream side device list.
FIG. 13 is a flowchart illustrating processing when the image forming apparatus detected communication error.

Due to the network configuration processing as above, the image forming apparatus 1 manages the node ID of the accessory devices which constitutes the image forming system. FIG. 12 is a diagram showing the upstream side device list and the downstream side device list of the accessory devices included in the network of the image forming system configured through the processing in FIGS. 6 to 11. Using the upstream side device list and the downstream side device list, the image forming apparatus 1 stores the node ID, which is the device identification information. The node ID of the upstream side devices and the downstream side devices is respectively stored in the order closer to the image forming apparatus 1.

(Processing when a Communication Error Occurred and Network Configuration Changed)

Each device constituting the image forming system detects a communication error and changes in network configuration by the communication I/Fs 104 to 504. Based on the detection result, the image forming apparatus 1 can recognize a communication error or a change in the network constitution in real time. In the following, processing when the communication error occurred or network configuration is changed is described.

(Processing of the Image Forming Apparatus)

FIG. 13 is a flowchart illustrating processing when the communication I/F 104 of the image forming apparatus 1 detected the communication error.

When the communication I/F 104 detects the occurrence of the communication error caused by the failure of establishing communication with the network bus 10 (S1101: Y), the control unit 100 of the image forming apparatus 1 turns off the output ports 111 and 121 of the input/output port 105 by the CPU 101 (S1102). Due to this, the control unit 100 notifies the sheet feeding device 2 and the stacker 3, each of which is adjacent to the image forming apparatus 1, that the communication can no longer be established. Thereafter, the CPU 101 erases the upstream side device list and the downstream side device list stored in the RAM 103 and returns to the state before configuring the network of the image forming system (S1103).

When the communication I/F 104 detects that the communication with the network bus 10 is returned to the normal state after erasing the upstream side device list and the downstream side device list, the CPU 101 executes the network configuration processing shown in FIG. 6 to configure a network of the image forming system.

Figure 14:
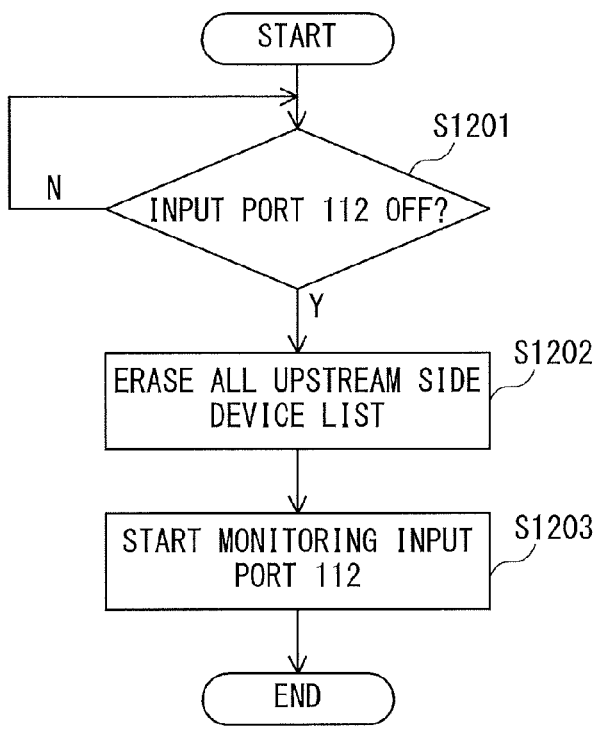
FIG. 14 is a flowchart illustrating processing of the image forming apparatus when the device which is adjacent to the upstream side detected communication error.

FIG. 14 is a flowchart representing processing of the control unit 100 of the image forming apparatus 1 when the communication I/F 204 of the accessory device (sheet feeding device 2) which is adjacent to the upstream side of the image forming apparatus 1 detected the communication error.

When the input port 112 of the input/output port 105 is turned off, the CPU 101 of the image forming apparatus 1 recognizes that the communication I/F 204 of the sheet feeding device 2 detected that the communication with the network bus 10 can no longer be established (S1201: Y). Since the communication with the upstream side accessory device can no longer be established, the CPU 101 erases the upstream side device list stored in the RAM 103 (S1202) and starts monitoring the input port 112 of the input/output port 105 (S1203).

When the communication I/F 204 of the sheet feeding device 2 detects that the communication with the network bus 10 is returned to the normal state, the input port 112 is turned on. Due to this, the CPU 101 recognizes that the network bus 10 becomes normal. Then, the CPU 101 executes the network configuration processing shown in FIG. 6 to configure the network of the image forming system.

Figure 15:
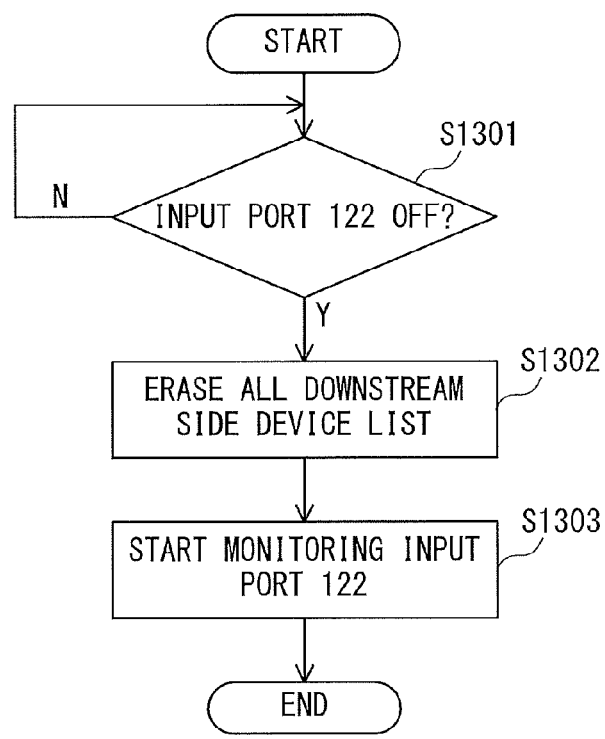
FIG. 15 is a flowchart illustrating processing of the image forming apparatus when the device which is adjacent to the downstream side detected communication error.

FIG. 15 is a flowchart representing processing of the control unit 100 of the image forming apparatus 1 when the communication I/F 304 of the accessory device (stacker 3) which is adjacent to the downstream side of the image forming apparatus 1 detected the communication error.

When the input port 122 of the input/output port 105 is turned off, the CPU 101 of the image forming apparatus 1 recognizes that the communication I/F 304 of the stacker 3 detected that the communication with the network bus 10 can no longer be established (S1301: Y). Since the communication with the downstream side accessory device can no longer be established, the CPU 101 erases the downstream side device list stored in the RAM 103 (S1302) and starts monitoring the input port 122 of the input/output port 105 (S1303).

When the communication I/F 304 of the stacker 3 detects that the communication with the network bus 10 is returned to the normal state, the input port 122 is turned on. Due to this, the CPU 101 recognizes that the network bus 10 becomes normal. Then, the CPU 101 executes the network configuration processing shown in FIG. 6 to configure the network of the image forming system.

Figures 16, 17:
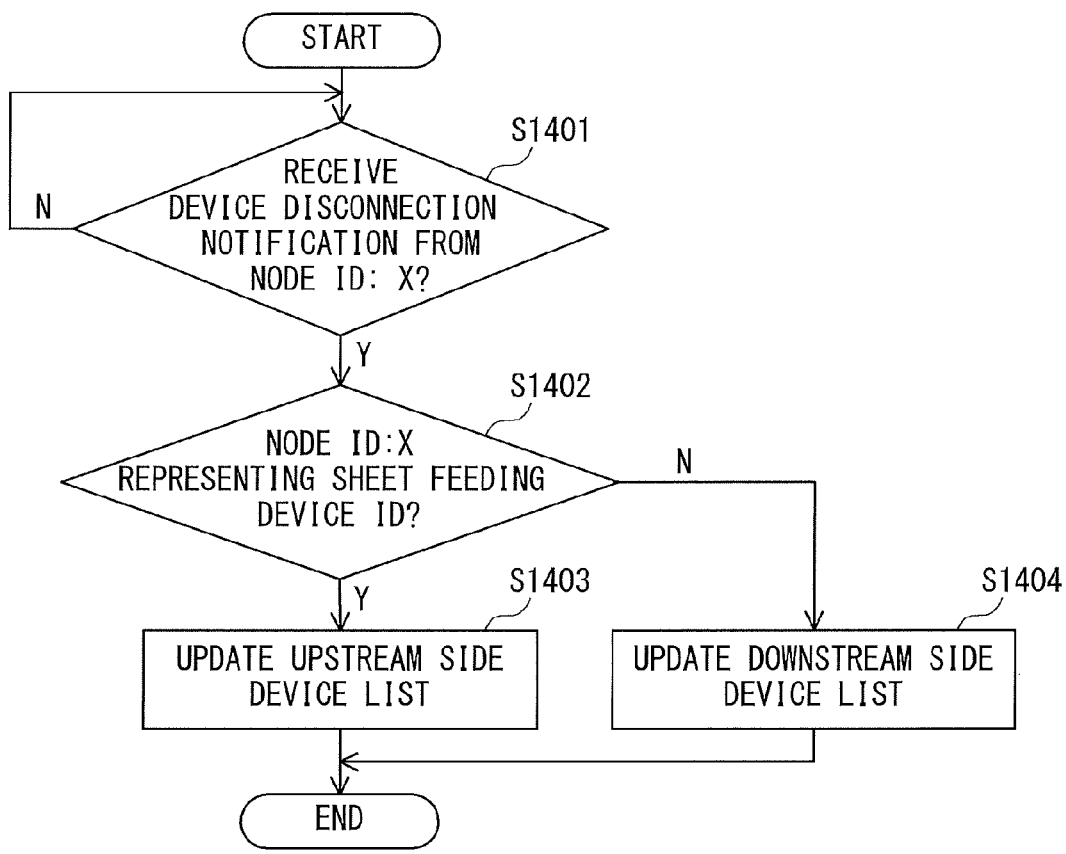
FIG. 16 is a flowchart illustrating processing of the image forming apparatus when the device which is not adjacent detected communication error.
FIG. 17 is a diagram illustrating upstream side of a device list and downstream side device list as updated.

FIG. 16 is a flowchart representing processing of the control unit 100 of the image forming apparatus 1 when the communication I/Fs 404 and 505 of the accessory devices (case work device 4, finisher 5), each of which is not adjacent to the image forming apparatus 1, detected the communication error.

When the communication I/F of the accessory device which is not adjacent to the image forming apparatus 1 detected the communication error of the network bus 10 and the communication can no longer be established, the CPU 101 of the image forming apparatus receives a "device disconnection notification" including node ID "X" from the accessory device of the node ID "X" (S1401). Normally, the device of the node ID "X" is the accessory device which is adjacent to the image forming apparatus 1 side of the apparatus which detected the communication error. The processing to transmit the "device disconnection notification" will be described later.

The CPU 101 determines whether the accessory device which transmitted the "device disconnection notification" is the sheet feeding device 2 or not. Thus, the CPU 101 determines whether or not the node ID: "X", included in the received "device disconnection notification", is identical to the node ID of the sheet feeding device 2 (S1402). If it is determined that the "device disconnection notification" is transmitted from the sheet feeding device 2 (S1402: Y), the CPU 101 deletes the node ID of the accessory device which is positioned upstream side of the sheet feeding device 2 from the upstream side device list stored in the RAM 103 (S1403).

If it is determined that the "device disconnection notification" is not transmitted from the sheet feeding device 2 (S1402: N), the CPU 101 deletes the node ID of the accessory device which is provided downstream side of accessory device of node ID "X" from the downstream side device list stored in the RAM 103 (S1404).

Through the processing as above, the upstream side device list and the downstream side device list are updated. For example, the lists shown in FIG. 12 are updated to that shown in FIG. 17. FIG. 17 represents examples of the upstream side device list and the downstream side device list updated when the "device disconnection notification" is received from the stacker 3 (node ID "5"). In this case, the stacker 3 transmits the "device disconnection notification" to the image forming apparatus 1 in response to the detection of the communication error by the case work device 4. The CPU 101 of the image forming apparatus 1 deletes the node ID stored after the node ID of the case work device 4 from the downstream side device list (in the present embodiment, the node ID of the case work device 4 and the finisher 5).

When the communication I/F of the accessory device which is not adjacent to the image forming apparatus 1 detected that the communication with the network bus 10 is returned to the normal state, the CPU 101 executes the network configuration processing shown in FIG. 6 to configure network of the image forming system. By the state of the input ports 112 and 122, the image forming apparatus 1 can detect return of the accessory device which is not adjacent to the image forming apparatus 1 to the normal state of the communication with the network bus 10. As mentioned below, the communication state of the network bus 10 is transmitted according to the state of the input port and output port of each accessory device and then, notified to the image forming apparatus 1.

(Processing of Sheet Feeding Device)

Figure 18:
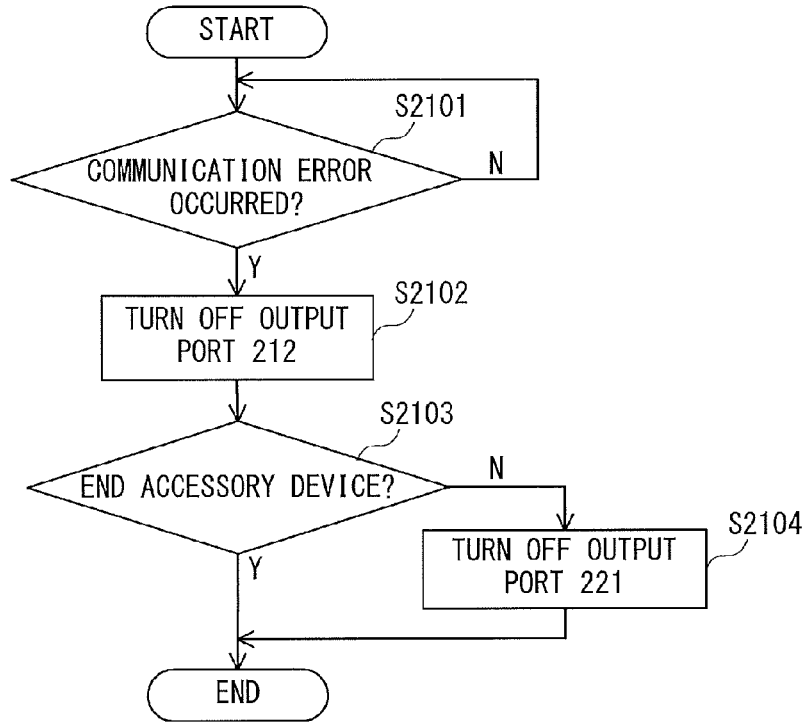
FIG. 18 is a flowchart illustrating processing when the sheet feeding device detected communication error.

FIG. 18 is a flowchart illustrating processing when the communication I/F 204 of the sheet feeding device 2 detected the communication error.

When the communication I/F 204 detects the occurrence of the communication error caused by the failure of establishing communication with the network bus 10 (S2101: Y), the control unit 200 of the sheet feeding device 2 turns off the output port 212 of the input/output port 205 by the CPU 201 (S2102). Due to this, the control unit 200 notifies the image forming apparatus 1 which is adjacent to the sheet feeding device 2 that the communication can no longer be established. Thereafter, by referring to the end detection port 241 of the input/output port 205, the CPU 201 determines whether the sheet feeding device 2 is the end accessory device or not (S2103). If it is determined that the sheet feeding device 2 is the end accessory device (S2103; Y), the CPU 201 ends the processing. If it is determined that the sheet feeding device 2 is not the end accessory device (S2103; N), the CPU 201 turns off the output port 221 of the input/output port 205, notifies the accessory device which is adjacent to the upstream side that the communication with the network bus 10 can no longer be established and ends the processing (S2104).

As mentioned, by turning off the output ports 212 and 221, the sheet feeding device 2 notifies the image forming apparatus 1 and other accessory device, each of which is adjacent to the sheet feeding device 2, that the communication with the network bus 10 can no longer be established. Due to this, the image forming apparatus 1 and other accessory device, each of which is adjacent to the sheet feeding device 2, can recognize that the sheet feeding device 2 can no longer establish communication with the network bus 10.

Figure 19:
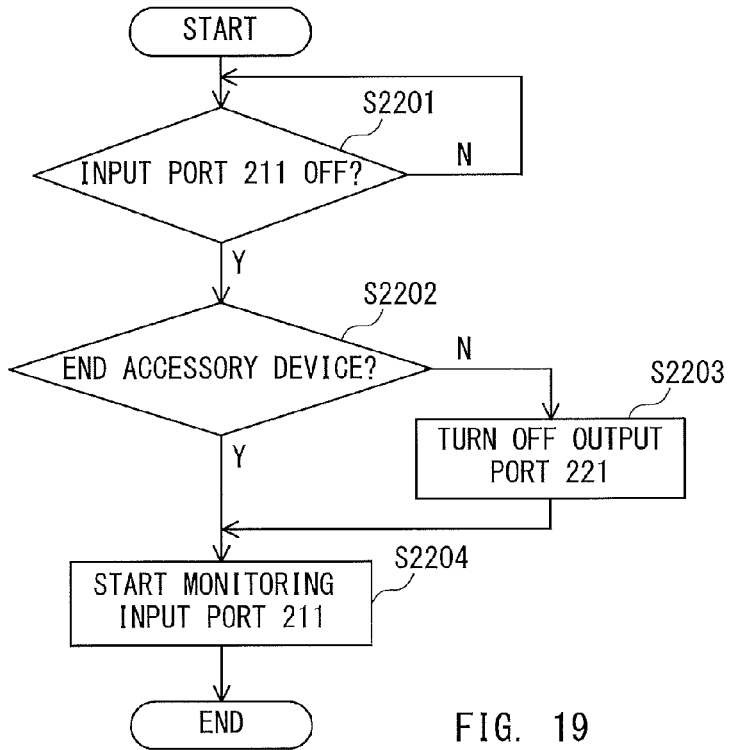
FIG. 19 is a flowchart illustrating processing of the sheet feeding device when the device which is adjacent to the downstream side detected communication error.

FIG. 19 is a flowchart representing processing of the control unit 200 of the image forming apparatus 2 when the apparatus which is adjacent to the downstream side of the sheet feeding device 2 (image forming apparatus 1) detected the communication error.

When the input port 211 of the input/output port 205 is turned off (S2201: Y), the control unit 200 of the sheet feeding device 2 recognizes that the device which is adjacent to the downstream side of the sheet feeding device 2 (image forming apparatus 1) detected the communication error. Due to this, the sheet feeding device 2 determines that the sheet feeding device 2 is disconnected from the network of the image forming system. When the image forming apparatus 1 detects the communication error and turns off the output port 111 (S1102 in FIG. 13), the input port 211 is turned off.

By confirming the end detection port 241 of the input/output port 205, the CPU 201 of the control unit 200 determines whether the sheet feeding device 2 is the end accessory device or not (S2202). If it is determined that the sheet feeding device 2 is not the end accessory device (S2202: N), the CPU 201 turns off the output port 221 of the input/output port 205 (S2203). If it is determined that the sheet feeding device 2 is the end accessory device (S2202: Y), or after turning off the output port 221, the CPU 201 starts monitoring the state of the input port 211 of the input/output port 205 and ends processing (S2204). By monitoring the state of the input port 211, the CPU 201 waits for the network reconfiguration.

As mentioned, when the device which is adjacent to the downstream side of the sheet feeding device 2 detects the communication error by the network bus 10, by turning off the output port 221, the sheet feeding device 2 notifies the upstream side device that the sheet feeding device 2 is disconnected from the network of the image forming system.

Figure 20:
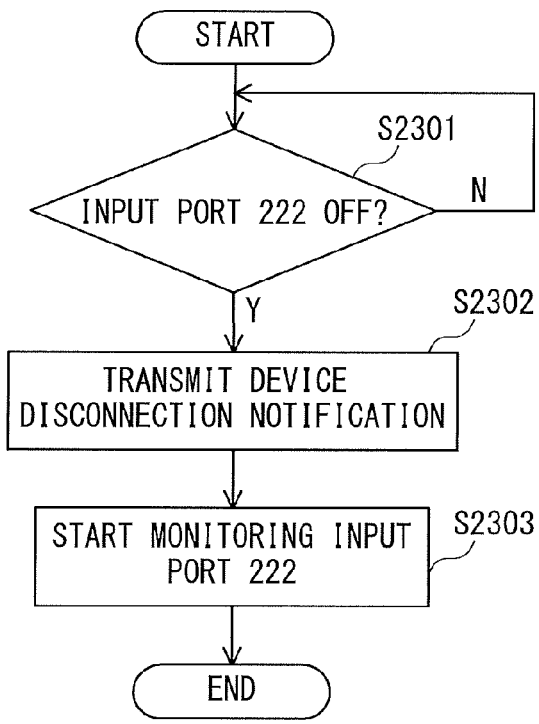
FIG. 20 is a flowchart illustrating processing of the sheet feeding device when the device which is adjacent to the upstream side detected communication error.

FIG. 20 is a flowchart representing processing of the control unit 200 of the image forming apparatus 2 when the accessory device which is adjacent to the upstream side of the sheet feeding device 2 detected the communication error.

When the input port 222 of the input/output port 205 is turned off (S2301: Y), the control unit 200 of the sheet feeding device 2 recognizes that the accessory device which is adjacent to the upstream side detected the communication error. Due to this, the sheet feeding device 2 determines that the adjacent accessory device is disconnected from the network of the image forming system.

Since the accessory device which is adjacent to and at the upstream side of the sheet feeding device 2 can no longer establish communication via the network bus 10 due to the communication error, the CPU 201 of the control unit 200, on behalf of the accessory device, transmits the "device disconnection notification" to the image forming apparatus 1 via the network bus 10 (S2302). The "device disconnection notification" is a notification indicating that the accessory device adjacent to the source of the notification is disconnected from the network of the image forming system. After transmitting the "device disconnection notification", the CPU 201 starts monitoring the state of the input port 222 of the input/output port 205 and ends processing (S2303). By monitoring the state of the input port 222, the CPU 201 waits for the return of the accessory device which is adjacent to the upstream side to the network.

As mentioned, by transmitting the "device disconnection notification" to the image forming apparatus 1, the sheet feeding device 2 notify the image forming apparatus 1 that the communication with the network bus 10 of the accessory device provided upstream side of the sheet feeding device 2 can no longer be established.

(Processing of Stacker)

Figure 21:
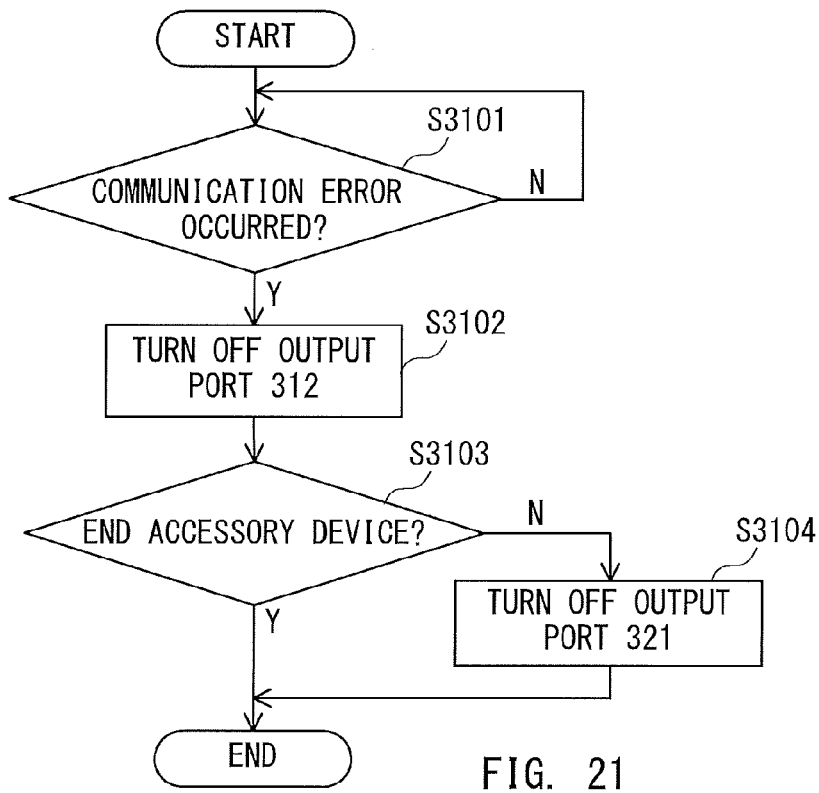
FIG. 21 is a flowchart illustrating processing when the stacker detected communication error.

FIG. 21 is a flowchart illustrating processing when the communication I/F 304 of the stacker 3 detected the communication error. Similar to the case of the sheet feeding device 2 in FIG. 18, when the communication I/F 304 detects the occurrence of the communication error (S3101: Y), the stacker 3 turns off the output port 312 and notifies the image forming apparatus 1 that the communication can no longer be established (S3102). Thereafter, if the stacker 3 is the end accessory device, the stacker 3 ends the processing (S3103: Y). If the stacker 3 is not the end accessory device (S3103: Y), the stacker 3 turns off the output port 321, notifies the accessory device which is adjacent to the downstream side of the stacker 3 (case work device 4) that the communication with the network bus 10 can no longer be established, and ends the processing (S3104).

As mentioned, by turning off the output ports 312 and 321, the stacker 3 notifies the image forming apparatus 1 and other accessory device, each of which is adjacent to the stacker 3, that the communication with the network bus 10 can no longer be established. Due to this, the image forming apparatus 1 and other accessory device, each of which is adjacent to the stacker 3, can recognize that the stacker 3 can no longer establish communication with the network bus 10.

Figure 22:
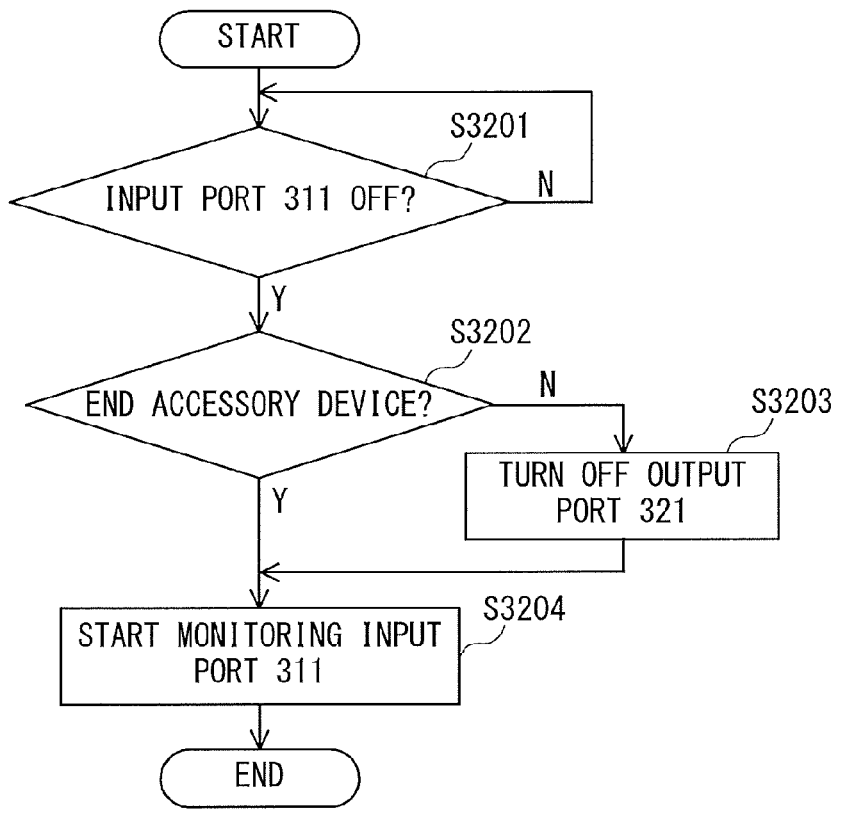
FIG. 22 is a flowchart illustrating processing of the stacker when the device which is adjacent to the upstream side communication error.

FIG. 22 is a flowchart representing processing of the control unit 300 of the stacker 3 when the apparatus which is adjacent to the upstream side of the stacker 3 (image forming apparatus 1) detected the communication error. Similar to the case of the sheet feeding device 2 in FIG. 19, the stacker 3 recognizes that when the input port 311 is turned off, the device which is adjacent to the upstream side of the stacker 3 (image forming apparatus 1) detected the communication error. Then, the stacker 3 determines that the stacker 3 is disconnected from the network of the image forming system (S3201: Y). If the stacker 3 is not the end accessory device, the stacker 3 turns off the output port 321 and starts monitoring the input port 311 (S3202: N, S3203, S3204). If the stacker 3 is the end accessory device, the stacker 3 starts monitoring the input port 311 (S3202: Y, S3204). By monitoring the state of the input port 311, the CPU 301 of the stacker 3 waits for the network reconfiguration.

As mentioned, when the device which is adjacent to the upstream side of the stacker 3 detects the communication error by the network bus 10, by turning off the output port 321, the stacker 3 notifies the downstream side device that the stacker 3 is disconnected from the network of the image forming system.

Figure 23:
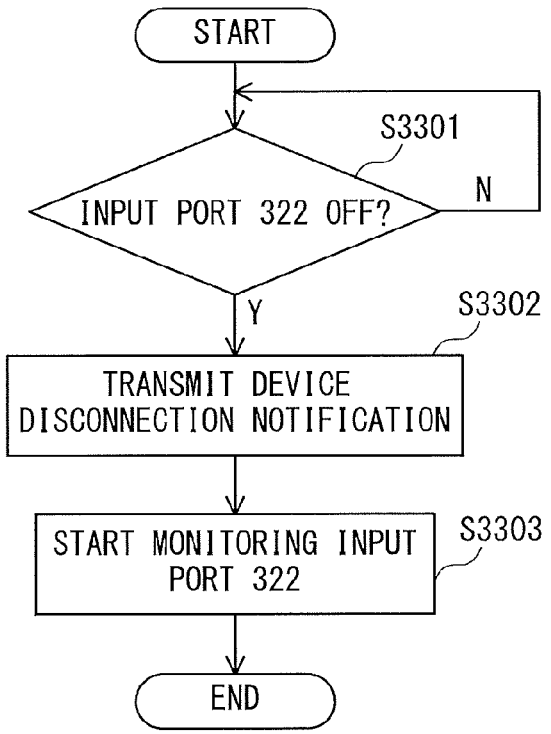
FIG. 23 is a flowchart illustrating processing of the stacker when the device which is adjacent to the downstream side detected communication error.

FIG. 23 is a flowchart representing processing of the control unit 300 of the stacker 3 when the device which is adjacent to the downstream side of the stacker 3 (case work device 4) detected the communication error. Similar to the case of the sheet feeding device 2 in FIG. 20, the stacker 3 recognizes that when the input port 322 is turned off, the device which is adjacent to the downstream side of the stacker 3 (case work device 4) detected the communication error (S3301: Y). Due to this, the stacker 3 transmits the "device disconnection notification" to the image forming apparatus 1 via the network bus 10 (S3302), starts monitoring the state of the input port 322, and ends the processing (S3303). By monitoring the state of the output port 322, the CPU 301 of the stacker 3 waits for the return of the accessory device which is adjacent to the downstream side of the stacker 3 to the network.

As mentioned, by transmitting the "device disconnection notification" to the image forming apparatus 1, the stacker 3 reports to the image forming apparatus 1 that the communication with the network bus 10 of the accessory device provided downstream side of the stacker 3 can no longer be established.

(Processing of Case Work Device)

Figure 24:
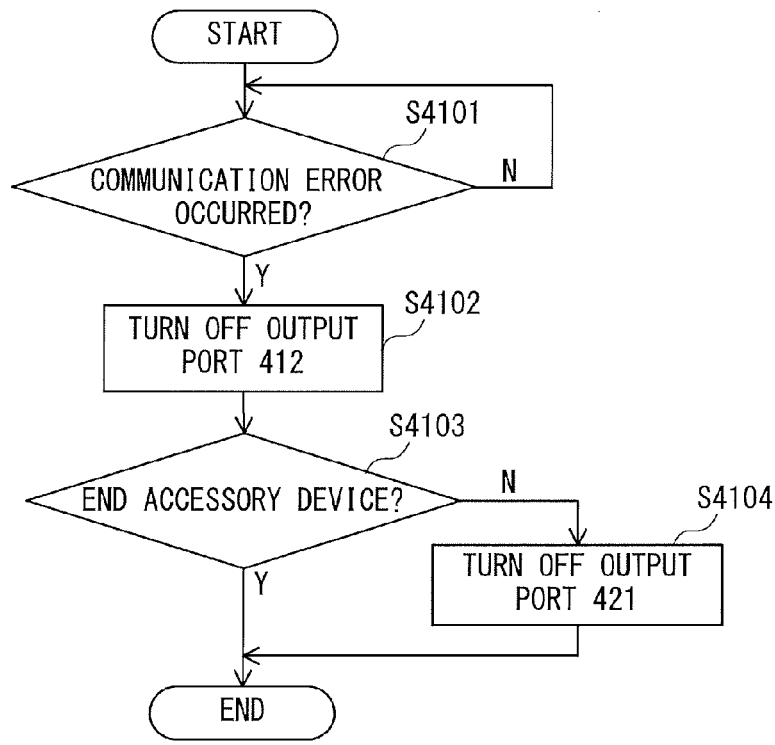
FIG. 24 is a flowchart illustrating processing when the case work device detected communication error.

FIG. 24 is a flowchart illustrating processing when the communication I/F 404 of the case work device 4 detected the communication error. Similar to the case of the sheet feeding device 2 in FIG. 18, when the communication I/F 404 detects the occurrence of the communication error (S4101: Y), the case work device 4 turns off the output port 412 and notifies the device which is adjacent to the upstream side (stacker 3) that the communication can no longer be established (S4102). Thereafter, if the case work device 4 is the end accessory device, the case work device 4 ends the processing (S4103: Y). If the case work device 4 is not the end accessory device (S4103: Y), the case work device 4 turns off the output port 421 (S4104), and notifies the accessory device which is adjacent to the downstream side of the case work device 4 that the communication with the network bus 10 can no longer be established, and ends the processing.

As mentioned, by turning off the output ports 412 and 421, the case work device 4 notifies the other accessory device which is adjacent to the case work device 4 that the communication with the network bus 10 can no longer be established. Due to this, the other accessory device which is adjacent to the case work device 4 can recognize that the case work device 4 can no longer establish communication with the network bus 10.

Figure 25:
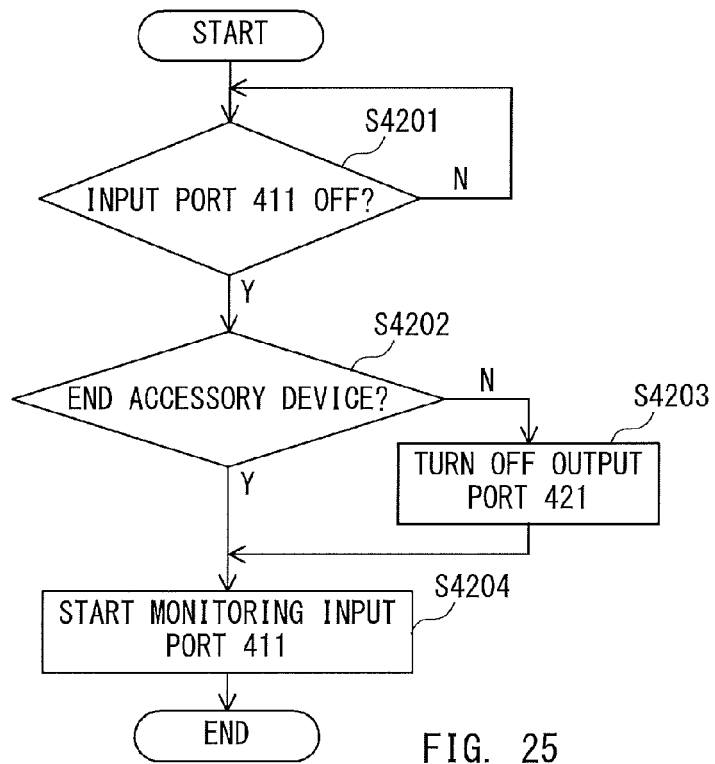
FIG. 25 is a flowchart illustrating processing of the case work device when the device which is adjacent to the upstream side detected communication error.

FIG. 25 is a flowchart representing processing of the control unit 400 of the case work device 4 when the device which is adjacent to the upstream side of the case work device 4 (stacker 3) detected the communication error. Similar to the case of the sheet feeding device 2 in FIG. 19, the case work device 4 recognizes, from the fact that the input port 411 is turned off, that the device which is adjacent to the upstream side of the case work device 4 detected the communication error. Then, the case work device 4 determines that the case work device 4 is disconnected from the network of the image forming system (S4201: Y). If the case work device 4 is not the end accessory device, the case work device 4 turns off the output port 421 and starts monitoring the input port 411 (S4202: N, S4203, S4204). If the case work device 4 is the end accessory device, the case work device 4 starts monitoring the input port 411 (S4202: Y, S4204). By monitoring the state of the input port 411, the CPU 401 waits for the network reconfiguration.

As mentioned, when the device which is adjacent to the upstream side of the case work device 4 detects the communication error by the network bus 10, by turning off the output port 421, the case work device 4 notifies that the case work device 4 is disconnected from the network of the image forming system to the device of the downstream side of the case work device 4.

Figure 26:
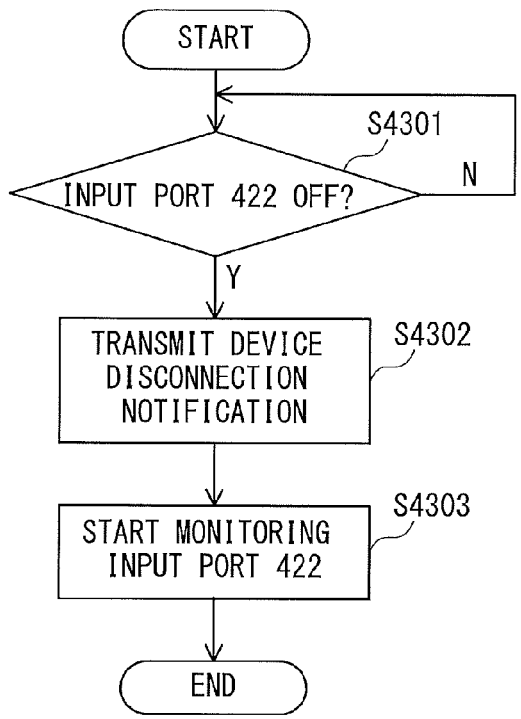
FIG. 26 is a flowchart illustrating processing of the case work device when the device which is adjacent to the downstream side detected communication error.

FIG. 26 is a flowchart representing processing of the control unit 400 of the case work device 4 when the device which is adjacent to the downstream side of the case work device 4 (finisher 5) detected the communication error. Similar to the case of the sheet feeding device 2 in FIG. 20, the case work device 4 recognizes that when the input port 422 is turned off, the accessory device which is adjacent to the downstream side of the case work device 4 detected the communication error (S4301: Y). Due to this, the case work device 4 transmits the "device disconnection notification" to the image forming apparatus 1 via the network bus 10 (S4302), starts monitoring the state of the input port 422, and ends the processing (S4303). By monitoring the state of the input port 422, the CPU 401 waits for the return of the accessory device which is adjacent to the downstream side of the case work device 4 to the network.

As mentioned, by transmitting the "device disconnection notification" to the image forming apparatus 1, the case work device 4 reports to the image forming apparatus 1 that the communication with the network bus 10 of the accessory device provided downstream side of the case work device 4 can no longer be established.

(Processing of Finisher)

Figure 27:
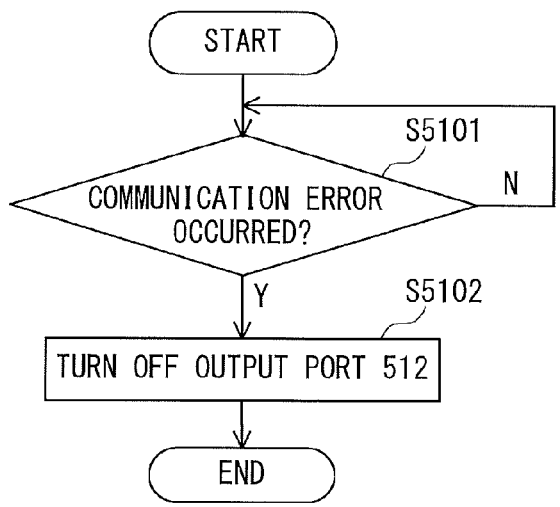
FIG. 27 is a flowchart illustrating processing when the finisher detected communication error.

FIG. 27 is a flowchart illustrating processing when the communication I/F 504 of the finisher 5 detected the communication error. The finisher 5 detects the occurrence of the communication error caused by the failure of establishing communication with the network bus 10 through the communication I/F 504 (S5101: Y). Due to this, the CPU 501 turns off the output port 512 of the input/output port 505, notifies the accessory device which is adjacent to the upstream side of the finisher 5 (case work device 4) that the communication with the network bus 10 can no longer be established and ends the processing (S5102). The finisher 5 can only be provided at the end of the network in the image forming system. Thus, the finisher 5 does not determine whether the finisher 5 is the end accessory device or not, which other accessory devices do, and notifies the accessory device which is adjacent to the upstream side of the finisher 5 that the communication with the network 10 can no longer be established.

As mentioned, by turning off the output port 512, the finisher 5 notifies the other accessory device which is adjacent to the finisher 5 that the communication with the network bus 10 can no longer be established. Due to this, the other accessory device which is adjacent to the finisher 5 can recognize that the finisher 5 can no longer establish communication with the network bus 10.

Figure 28:
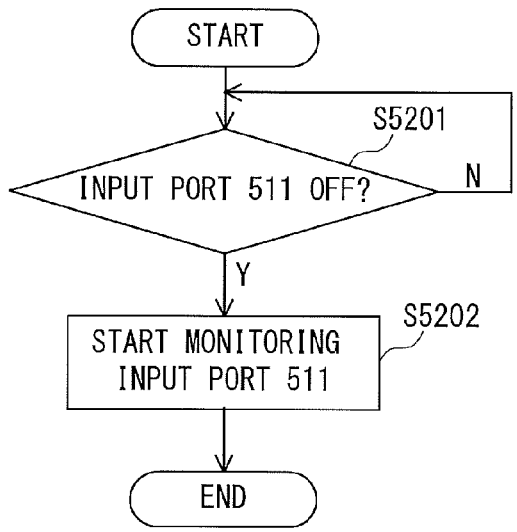
FIG. 28 is a flowchart illustrating processing of the finisher when the device which is adjacent to the upstream side detected communication error.

FIG. 28 is a flowchart representing processing of the control unit 500 of the finisher 5 when the apparatus which is adjacent to the upstream side of the finisher 5 (case work device 4) detected the communication error. The finisher 5 recognizes that when the input port 511 is turned off, the device which is adjacent to the upstream side of the finisher 5 detected the communication error (S5201). Then, the finisher 5 determines that the finisher 5 is disconnected from the network of the image forming system. Thereafter, the CPU 501 of the finisher 5 starts monitoring the input port 511 of the input/output port 505 (S5202). By monitoring the state of the input port 511, the CPU 501 waits for the network reconfiguration. As mentioned, the finisher 5 can only be provided at the end of the network in the image forming system. Thus, the finisher 5 does not determine whether the finisher 5 is the end accessory device or not but starts monitoring the input port 511.

As mentioned, when the device which is adjacent to the upstream side of the finisher 5 detects the communication error by the network bus 10, by monitoring the input port 511, the finisher 5 can wait for the network reconfiguration.

As mentioned, the image forming system of the present embodiment transmits the communication error of the network bus 10 between devices by the communication to/from the input/output ports not via the network bus 10. When detecting the communication error of the network bus 10, by erasing the identification information stored, the image forming apparatus 100 can recognize the network configuration in real time. Through the processing performed by each device shown in FIGS. 13 to 28 as above, the image forming apparatus 1 can detect the device which can no longer establish communication with the network bus 10 in real time. Thus, it becomes possible to take some appropriate actions when there is any change in the configuration of the image forming system. Each device can recognize the communication state by network bus 10 of the adjacent devices by ON/OFF of the input port and the output port. Each device represents its own communication state by the network bus 10 by ON/OFF of the input port and the output port. Due to this, the image forming apparatus 1 can detect normality/abnormality of the communication state of each device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions This application claims the benefit of Japanese Patent Application No. 2014-099602, filed May 13, 2014 which is hereby incorporated by reference wherein in its entirety.

What is claimed is:

1. An image forming system having an image forming apparatus configured to perform image formation and an accessory device configured to be capable of establishing communication with the image forming apparatus via a network bus, wherein the accessory device is adjacent to the image forming apparatus, and the accessory device comprises:
a first communication device configured to communicate with the image forming apparatus via the network bus, and detect a communication state of the network bus;

a first port to which a line, which is connected to the image forming apparatus and is different from the network bus, is connected, a first processor configured to control a state of the first port, and configured to control, when the detected communication state of the network bus represents an abnormal state, a state of the first port to be in an off state for notifying the adjacent image forming apparatus or other adjacent accessory device of the abnormal state, wherein the image forming apparatus comprises:
a second communication device configured to communicate with the accessory device via the network bus;
a second port to which the line is connected;
a storing unit configured to store identification information which identifies the accessory device; and
a second processor configured to erase, when a state of the second port is an off state, the identification information of the accessory device.

2. A network management device comprising:
a communication interface configured to establish communication with other devices via network bus and to detect a communication error of the network bus;
a notification unit configured to notify an adjacent device of a communication state of the network bus not via the network bus;
a memory configured to store identification information to identify other devices capable of establishing communication via the network bus; and
a processor configured to erase the identification information stored in the storing unit and to cause the notification unit to notify the adjacent device of occurrence of the communication error of the network bus when the communication interface detects communication error of the network bus.

3. The network management device according to claim 2, wherein:
the other devices are provided in series and the network management device is provided intervening the other devices;
the memory is configured to store the identification information to identify the other devices provided on one side in an arrangement order of the devices thereof as a first list and to store the identification information to identify the other devices provided on the other side in an arrangement order of the devices thereof; and
when the occurrence of the communication error of the network bus is notified from the adjacent other device, the control unit is configured to erase the identification information of the other device.

4. A network management method executed in an image forming system, the image forming system including an image forming apparatus configured to perform image formation and an accessory device configured to be capable of establishing communication with the image forming apparatus via a network bus, and the image forming apparatus is further configured to store identification information for identifying the accessory device, comprising:
detecting, by the accessory device, a communication state of the network bus to notify the adjacent image forming apparatus or an other adjacent accessory device of an occurrence of communication error of the network bus not via the network bus; and
erasing, by the image forming apparatus, the identification information stored when the occurrence of the communication error of the network bus is notified from the other adjacent accessory device.

5. The network management method according to claim 4, further comprising:
erasing, by the image forming apparatus, all the identification information stored in the storing unit when the occurrence of the communication error of the network bus is detected; and
notifying, by the image forming apparatus, the adjacent accessory device of the occurrence of the communication error of the network bus not via the network bus.

6. The network management method according to claim 5, further comprising:
storing, by the image forming apparatus, the identification information of the accessory device connected to one side of the image forming apparatus in series in an arrangement order of the accessory devices thereof as a first list;
storing, by the image forming apparatus, the identification information of the accessory device connected to the other side of the image forming apparatus in series in an arrangement order of the accessory devices thereof a second list; and
erasing, by the image forming apparatus, the first list or the second list including the identification information of the adjacent accessory device when the occurrence of the communication error of the network bus is notified by an adjacent accessory device.

7. The network management method according to claim 6, further comprising:
monitoring, by the image forming apparatus, a detection result of communication state of the network bus of the adjacent accessory device after the list is erased.

8. The network management method according to claim 6, further comprising:
when the occurrence of the communication error of the network bus is notified from other adjacent accessory device which is adjacent to one side, if the other adjacent accessory device is closer to the image forming apparatus than the accessory device, notifying, by the accessory device, an accessory device which is adjacent to the other side, the occurrence of the communication error of the network bus; and
if the accessory device is closer to the image forming apparatus than the other adjacent accessory device, notifying, by the accessory device, the image forming apparatus that the other adjacent accessory device to the one side is disconnected from the network of the image forming system via the network bus.

9. The network management method according to claim 8, further comprising:
after notifying, by the accessory device, the accessory device which is adjacent to the other side of the occurrence of the communication error of the network bus, or after notifying, by the accessory device, the image forming apparatus that the other adjacent accessory device is the one side disconnected from the network of the image forming system, monitoring, by the accessory device, detection result of communication state of the network bus of the other adjacent accessory device.

10. The network management method according to claim 8, further comprising:
erasing, by the image forming apparatus, identification information after identification information of the other adjacent accessory device from the first list or the second list when disconnection of the other adjacent accessory device from the network of the image forming system is notified from the accessory device.

11. An image forming system including:
an image forming apparatus configured to perform image formation;
a first accessory device connected to a downstream side of the image forming apparatus;
a second accessory device provided at the downstream side of the first accessory device;
a network bus to which the image forming apparatus, the first accessory device and the second accessory device are connected;
a first line configured to connect the image forming apparatus and the first accessory device;
a second line configured to connect the first accessory device and the second accessory device;
wherein the first accessory devices comprises:
   a first communication device configured to communicate with the image forming apparatus via the network bus and detect a communication error of the network bus;
   a first output port to which the first line is connected;
   a first input port to which the second line is connected;
   a first processor configured to:
     detect, based on a state of the second line, an abnormal state of the second accessory device;
     cause, when the abnormal state of the second accessory device is detected, the first communication device to notify the image forming apparatus of the abnormal state of the second accessory device via the network bus; and
     cause, when the communication error of the network bus is detected, the state of the first output port to be an off state;
wherein the second accessory devices comprises:
   a second communication device configured to communicate with the image forming apparatus via the network bus, and detect a communication error of the network bus;
   a second output port to which the second line is connected; and
   a second processor configured to cause, when the communication error of the network bus is detected, a state of the second output port to be an off state; and
wherein the image forming apparatus comprises:
   a third communication device configured to communicate with the first and second accessory device via the network bus;
   a third input port to which the first line is connected; and
   a third processor configured to receive the abnormal state of the second accessory device from the second communication device via the network bus, and detect the abnormal state of the first accessory device based on the state of the first line.

* * * * *